United States Patent
Mitsuhara et al.

(10) Patent No.: US 7,682,252 B2
(45) Date of Patent: Mar. 23, 2010

(54) GAME DATA CONTROL PROGRAM, GAME DATA OVERWRITING PROGRAM AND GAME DATA OVERWRITING DEVICE

(75) Inventors: Satoshi Mitsuhara, Chuo-ku (JP); Hitoshi Yamagami, Kyoto (JP)

(73) Assignees: Creatures, Inc., Tokyo (JP); Nintendo Co., Ltd., Kyoto (JP)

( * ) Notice: Subject to any disclaimer, the term of this patent is extended or adjusted under 35 U.S.C. 154(b) by 1127 days.

(21) Appl. No.: 10/974,756

(22) Filed: Oct. 28, 2004

(65) Prior Publication Data

US 2005/0148394 A1 Jul. 7, 2005

(30) Foreign Application Priority Data

Nov. 19, 2003 (JP) ............................. 2003-389769

(51) Int. Cl.
*A63F 13/00* (2006.01)
*G06F 12/00* (2006.01)

(52) U.S. Cl. ...................................... 463/43; 711/115
(58) Field of Classification Search ............ 463/42–43, 463/1; 711/115

See application file for complete search history.

(56) References Cited

U.S. PATENT DOCUMENTS 6,438,649 B1 * 8/2002 Tanaka ....................... 711/115
6,508,711 B1 * 1/2003 Ono ............................. 463/43
6,674,438 B1 * 1/2004 Yamamoto et al. .......... 345/501
6,918,828 B2 * 7/2005 Horikawa ....................... 463/1
2004/0142751 A1 * 7/2004 Yamagami .................... 463/43

FOREIGN PATENT DOCUMENTS

| JP | 7-44378 | | 2/1995 |
| JP | 8-147220 | | 6/1996 |
| JP | 08147220 | * | 6/1996 |
| JP | 2001-251288 | | 9/2001 |
| JP | 2001-265658 | | 9/2001 |
| JP | 2001251288 | * | 9/2001 |
| JP | 2002-268948 | | 9/2002 |
| JP | 2003-288129 | | 10/2003 |
| JP | 2003288129 | * | 10/2003 |

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

Before game data is arranged, a storage area for the game data in an internal memory is determined so that each game parameter is stored in a different storage area each time the game data is arranged. Then, arrangement information that directly or indirectly indicates the storage area for each game parameter is stored in a specified area of the internal memory. Then, the game data is loaded from an external storage medium to the determined storage area. Moreover, when a game parameter in the internal memory needs to be referred to or overwritten during the game process, the storage area for the game parameter is determined by referring to the arrangement information. Thus, it is possible to prevent general users from easily modifying the game data.

19 Claims, 18 Drawing Sheets

F I G. 1
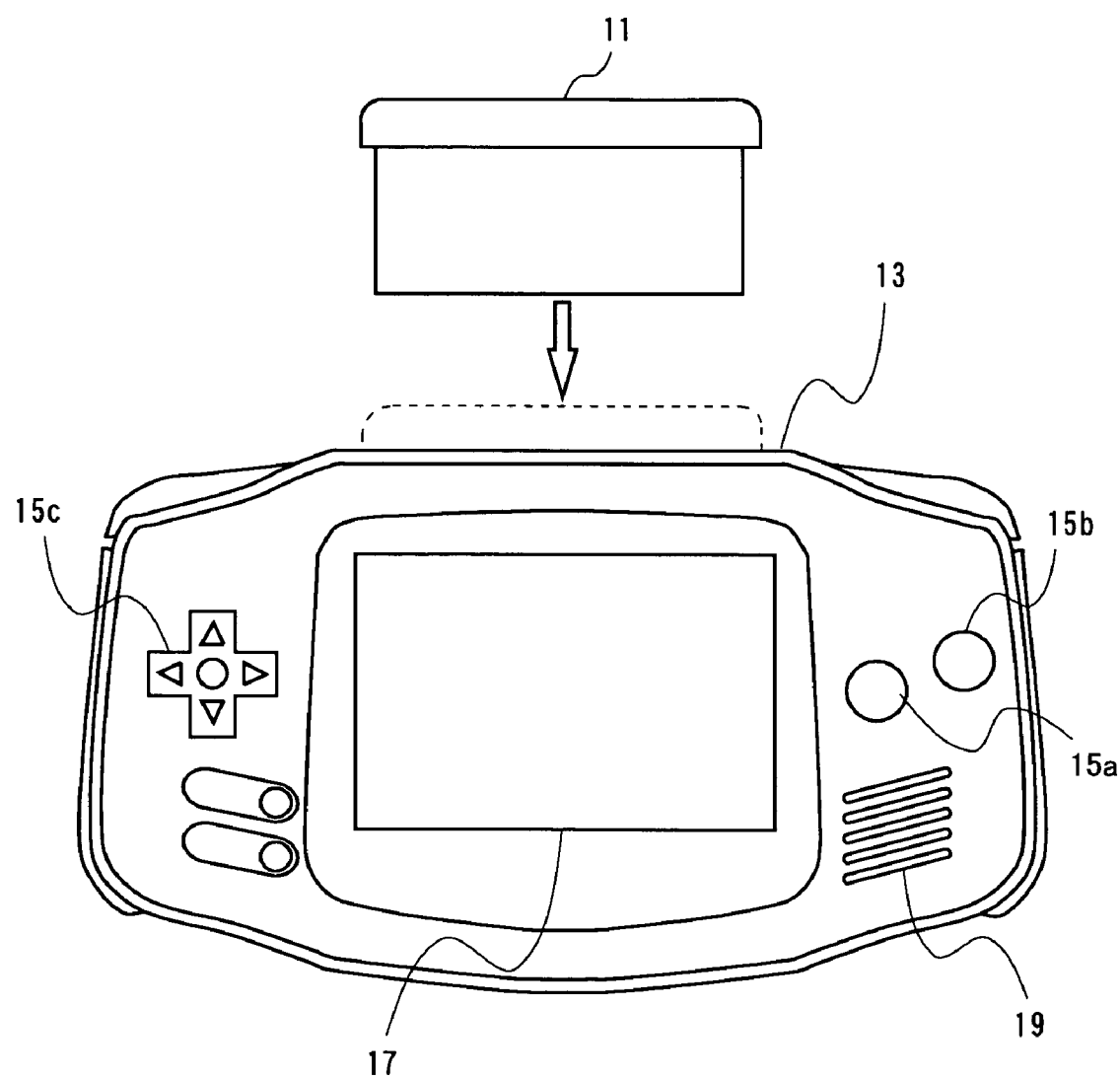

F I G. 1 6

| GAME PARAMETERS | ADDRESS IN BACKUP RAM | ADDRESS IN WORK RAM |
|---|---|---|
| PLAYER NAME | 0000h | AAB8h |
| H P | 0004h | AAB4h |
| M P | 0005h | AAB5h |
| AMOUNT OF MONEY | 0006h | AAB3h |
| WEAPONS | 0007h | AAB1h |
| ARMORS | 0009h | AAB6h |

GAME DATA CONTROL PROGRAM, GAME DATA OVERWRITING PROGRAM AND GAME DATA OVERWRITING DEVICE

FIELD OF THE INVENTION

The present invention relates to a game data control program, a game data overwriting program, and a game data overwriting device, and, more particularly, to a technique for arranging game data in an internal memory of a video game device for use in a game process, the game data including a plurality of game parameters indicating the status of a game and stored in an external storage medium.

BACKGROUND AND SUMMARY OF THE INVENTION

With a conventional video game machine, when a video game program is started and a game starts progressing, game data representing the current status of the game is produced in an internal memory provided in the video game machine. When the player suspends the game, the game data in the internal memory is temporarily saved in a memory card inserted in the video game device. When the player resumes the game, the game data temporarily saved in the memory card is loaded to the internal memory. Then, the game process is performed while referring to the game data, which has been loaded to the internal memory. Thus, the player can resume the game from the point where the game was suspended.

When a saved game is resumed, the game data stored in the memory card is always loaded to a particular storage address of the internal memory. For example, the value of a particular game parameter included in the game data (e.g., the value representing the life points of the player character) is always loaded to a particular area of the internal memory. Therefore, in the game process, it is possible to immediately obtain the value of a game parameter by referring to the particular address corresponding to the game parameter to be obtained. Specifically, a value representing the life points of the player character is stored in a first storage address of the internal memory, a value representing the coordinate of the position of the player character in the game space is stored in a second storage address, a value representing the amount of money in the game space is stored in a third storage address, and other values representing the kinds of monsters that the player character has captured, etc., are stored in fourth through tenth storage addresses.

It is known that the status of a game can be reproduced based on game data as described above. Game data overwriting devices, and the like, are sold for overwriting and modifying the game data by, for example, increasing the amount of money in the game world or maximizing other parameters of the game character.

In order to prevent such modifications, game data stored in a backup memory such as a memory card is encrypted in some cases for example, Japanese Laid-Open Paten Publication No. 2001-265658). In such cases, it is necessary to decrypt the game data stored in the backup memory in order to modify the game data. Then, it is quite difficult to overwrite the game data.

In view of this, there have been game data overwriting devices for allowing the user to overwrite game data which has been loaded from the backup memory to the internal memory during the game process, instead of modifying the game data as being stored in the backup memory.

The user of such a game data overwriting device uses values being displayed on the game screen to identify storage addresses of the internal memory at which these values are stored. For example, where the amount of money is being displayed on the game screen, a value equal to the amount of money is searched for in the game data stored in the internal memory to identify the storage address of the internal memory at which the value is stored. Thus, the player can identify storage addresses for particular game parameters. Then, the player can overwrite the value stored in an identified storage address to manipulate a particular game parameter as desired.

Japanese Laid-Open Patent Publication No. 7-44378 discloses a method for starting a program with which alterations to the program can be detected. However, the disclosure is directed to detecting alterations to a program by using checksums when starting the program, but not to preventing the overwriting of data stored in an internal memory.

If a player identifies a storage address for a particular game parameter, that information may become known to large numbers of the general public through the Internet, magazines, etc. Identifying addresses at which game parameters are stored as described above requires a certain level of technical knowledge and a lot of time and effort, and is a difficult task for general users. However, once the information on addresses where particular game parameters are stored is publicly disclosed, even general users can easily modify the game data.

Thus, anyone can easily modify the game data by purchasing a game data overwriting device. Then, a large number of players may modify the game data, whereby the game progresses in a manner not intended by the game maker. This may significantly reduce, or even destroy, the playability of the game. Particularly, with multiplayer online games, or the like, if an abnormally strong player character is created through modifications of the game data, the power balance between such a strong player character and a normal player character cannot be maintained, and the overall game balance may be destroyed. Another problem is that such modifications of game data may encourage infringement of copyright (see, for example, Japanese Supreme Court Case 1999 (ju) No. 955 delivered on Feb. 13, 2001).

Although such a problem may be avoided by encrypting the game data stored in the internal memory, a process for recovering complicated encrypted data imposes a high computational load, which may even affect the execution of the video game program. This will also make it quite time-consuming to refer to, or overwrite game data in, an internal memory for debugging a video game program being developed.

Thus, if overwriting game data is made overly difficult, reading out the game data by the video game program may impose an excessive computational load and the debugging of the program may become excessively time-consuming. Nevertheless, if game data stored in an internal memory is left as it is as in the prior art keeping the debugging process easy, the data can easily be modified.

The present exemplary embodiments have the following features to solve these problems. Note that reference numerals, etc., shown in parentheses are for indicating how those elements are related to the exemplary illustrative embodiments below to assist the reader in understanding the present invention, but they are in no way intended to restrict the scope of the invention.

A computer-readable recording medium of the exemplary illustrative embodiments is a computer-readable recording medium (11), storing a first game data control program for arranging game data in an internal memory (35) of a video game device (13) for use in a game process, the game data including a plurality of game parameters representing a status of a game stored in an external storage medium (23) connected to the video game device, wherein the game data control program instructs a computer to function as storage area a setter (31, S203), a game data loader (31, S107), an arrangement information storage mechanism (31, S205), and a storage area determination mechanism (31, S503). Before the game data is arranged, the storage area setter sets a storage area for the game data in the internal memory so that each game parameter is arranged in a different storage area each time the game data is arranged (FIG. 5, FIG. 14, FIG. 15). The game data loader loads the game data from the external storage medium to the storage area set by the storage area setter. When the storage area setter sets the storage area for the game data, the arrangement information storage mechanism stores arrangement information (FIG. 5, FIG. 14, FIG. 15) in a specified area of the internal memory, the arrangement information being information which directly or indirectly indicates the storage area for each game parameter. When a game parameter in the internal memory needs to be referred to or overwritten during the game process, the storage area determination mechanism determines the storage area for the game parameter by referring to the arrangement information.

In one exemplary illustrative embodiment, the storage area setter directly or indirectly sets the storage area for the game data by specifying at least one address of the internal memory (e.g., the storage start address).

In one exemplary illustrative embodiment, the game data control program instructs the computer to function further as a game data saver (31, S603) for saving the game data in a predetermined original format in the external storage medium by referring to the arrangement information when the game data in the internal memory needs to be saved in the external storage medium during the game process.

In one exemplary illustrative embodiment, the storage area setter sets the storage area for the game data in the internal memory based on a random number (S201).

In one exemplary illustrative embodiment, the storage area setter specifies an offset value for shifting the storage area for the game data as a whole in the internal memory so that the storage area for the game data is changed each time the game data is arranged; and the game data loader loads the game data as a whole to the internal memory so that a storage position relationship between the game parameters is maintained, by using, as a base address, an address obtained by adding the offset value to a specified address of the internal memory (FIG. 5).

The game data is divided into a plurality of blocks, and the storage area setter sets a storage area for each block of game data in the internal memory so that a storage position relationship between the blocks is changed each time the game data is arranged (FIG. 14). In one exemplary illustrative embodiment, each block corresponds in size to one address of the internal memory.

In one exemplary illustrative embodiment, the game data control program instructs the computer to function further as: storage area changer (31, 5405) for changing the storage area for each game parameter which has been loaded to the internal memory at a predetermined time during the game process; and data rearranger (31, S409) for rearranging the game parameters based on results of the storage area changing process by the storage area changer, wherein the arrangement information storage mechanism updates the arrangement information when the data rearranger rearranges the game parameters (S407).

Another computer-readable recording medium of an exemplary illustrative embodiment is a computer-readable recording medium (11), storing a second game data control program for arranging game data in an internal memory (35) of a video game device (13) for use in a game process, the game data including a plurality of game parameters representing a status of a game stored in an external storage medium (23) connected to the video game device, wherein the game data control program instructs a computer to function as game a data loader (31, S107), a storage area changer (31, S405), a data rearranger (31, S409), an arrangement information storage mechanism (31, S407), and a storage area determination mechanism (31, S503). The game data loader loads the game data from the external storage medium to the internal memory. The storage area changer changes a storage area for each game parameter which has been loaded to the internal memory, at a predetermined time during the game process (FIG. 7, FIG. 14, FIG. 15). The data rearranger rearranges the game parameters based on results of the storage area changing process by the storage area changer. When the game parameters are rearranged by the data rearrangement means, the arrangement information storage mechanism stores arrangement information (FIG. 5, FIG. 14, FIG. 15) in a specified area of the internal memory, the arrangement information being information which directly or indirectly indicates the storage area for each game parameter. When a game parameter in the internal memory needs to be referred to or overwritten during the game process, the storage area determination mechanism determines the storage area for the game parameter by referring to the arrangement information.

In one exemplary illustrative embodiment, the storage area changer directly or indirectly sets the storage area for the game data after the storage area changing process by specifying at least one address of the internal memory (e.g., the storage start address).

In one exemplary illustrative embodiment, when the game data in the internal memory needs to be saved in the external storage medium during the game process, the game data control program instructs the computer to function further as game data saver (31, S603) for saving the game data in a predetermined original format in the external storage medium by referring to the arrangement information.

In one exemplary illustrative embodiment, the storage area changer changes the storage area for the game data in the internal memory based on a random number (S201).

In one exemplary illustrative embodiment, the storage area changer changes the storage area for the game data in the internal memory by specifying an offset value for shifting the storage area for the game data as a whole in the internal memory; and the data rearranger rearranges the game data as a whole in the internal memory so that a storage position relationship between the game parameters is maintained, by using, as a base address, an address obtained by adding the offset value to a specified address of the internal memory (FIG. 7).

In one exemplary illustrative embodiment, the game data is divided into a plurality of blocks, and the storage area changer changes a storage area for each block of game data in the internal memory so that a storage position relationship between the blocks is changed each time the game data is rearranged (FIG. 14).

In one exemplary illustrative embodiment, each block corresponds in size to one address of the internal memory.

Still another computer-readable recording medium of the exemplary illustrative embodiments is a computer-readable recording medium, storing a first game data overwriting program for overwriting data of a predetermined parameter included in the game data, which is stored in the internal memory (35) by the first or second game data control program set forth above, wherein the game data overwriting program instructs a computer (79) to perform: a step of prompting a player to input a first search value (S703); a step of searching for a value corresponding to the first search value through the game data stored in the internal memory (S707) and detecting at least one first storage address at which the value is stored (S709); a step of following the first storage address, which dynamically changes, by using, as indices, values at a plurality of storage addresses which are each in a fixed positional relationship (e.g., being next to, or being apart from by a certain number of addresses) with the detected first storage address and the value at the first storage address (S715); a step of prompting the player to input a second search value (S721); a step of searching for a value corresponding to the second search value (S725) and detecting at least one second storage address at which the value is stored (S721); a step of determining a target storage address as being at least one of the second storage address that coincides with the first storage address (S731); a step of prompting the player to input a new value for the target storage address (S733); and a step of overwriting the value at the target storage address with the inputted new value (S735).

Still another computer-readable recording medium of the exemplary illustrative embodiments is a computer-readable recording medium, storing a second game data overwriting program for overwriting the game data, which is arranged in the internal memory (35) by the first or second game data control program set forth above, wherein the game data overwriting program instructs a computer (79) to perform: a step of receiving an input of a code for overwriting a predetermined item of the game data with a predetermined value (S803); a step of identifying a target storage address at which the predetermined game data item to be overwritten is stored, based on the inputted code and the arrangement information stored in the internal memory by the arrangement information storage mechanism (S809); and a step of overwriting a value of a game data item stored at the identified target storage address with the predetermined value indicated by the code (S811).

A game data overwriting device of an exemplary illustrative embodiments is a game data overwriting device, including therein the first or second game data overwriting program set forth above, and a control section (79) for overwriting a game data item according to the game data overwriting program.

With the first game data control program of the exemplary illustrative embodiments, each time the game data is loaded from the backup memory, the game data is stored at a different storage address of the internal memory. Therefore, even if someone identifies the storage address of the internal memory at which a particular parameter is stored, the data will be stored at a different storage address next time the game data is loaded from the backup memory. Thus, if someone overwrites data at a storage address publicly disclosed in a magazine or on the Internet, it will only destroy the game data. Therefore, it is possible to prevent general users from easily modifying the game data.

Where the loaded game data in the internal memory is arranged back in a predetermined original format when it is saved back in the external storage medium, the game data will be stored in the external storage medium always in a uniform format.

Where the storage area in the internal memory for the game data is set based on a random number, it is no longer possible to predict the area in the internal memory where a game parameter is to be loaded. Thus, it is more difficult to modify the game data.

Where the game data as a whole is shifted to a different area each time the game data is loaded, it is only required that the start address of the storage area for the game data, for example, is stored as the arrangement information, whereby it is possible to save space in the internal memory.

Where the game data is divided into a plurality of blocks, and the blocks are loaded into different areas each time the game data is loaded, it is more difficult to identify the area in the internal memory where a particular game data item is loaded, as compared with a case where the game data as a whole is shifted each time the game data is loaded. The smaller the block size is, the more difficult it is to identify the area where a particular game data item is loaded.

With the second game data control program of the exemplary illustrative embodiments, after the game data is loaded to the internal memory, the storage address at which the game data is stored is changed dynamically. Therefore, even when the game is being played, the storage address for the game data changes dynamically, whereby it is possible to more effectively prevent general users from easily modifying the game data.

With the first game data overwriting program of the exemplary illustrative embodiments, the storage address for the game parameter to be overwritten is identified taking into consideration not only the detected candidate storage address for the game parameter to be overwritten, but also values stored at other addresses each having a fixed positional relationship with the detected candidate storage address. Therefore, it is possible to detect the storage address for the game parameter to be overwritten even if the storage address for the game data periodically shifts in the internal memory.

With the second game data overwriting program of the exemplary illustrative embodiments, the game data is overwritten while referring to the arrangement information stored in a specified area of the internal memory. Therefore, it is possible to easily overwrite the game data in the internal memory simply by inputting a code even if the storage address for the game data periodically changes in the internal memory.

BRIEF DESCRIPTION OF THE DRAWINGS

These and other features and advantages will be better and more completely understood by reference to the following detailed description of exemplary illustrative embodiments in conjunction with the drawings, of which:

FIG. 1 is a view generally illustrating an exemplary video game system;

FIG. 16 shows a specific example of an address mapping table;

DETAILED DESCRIPTION

First Exemplary Illustrative Embodiment

Figure 2:
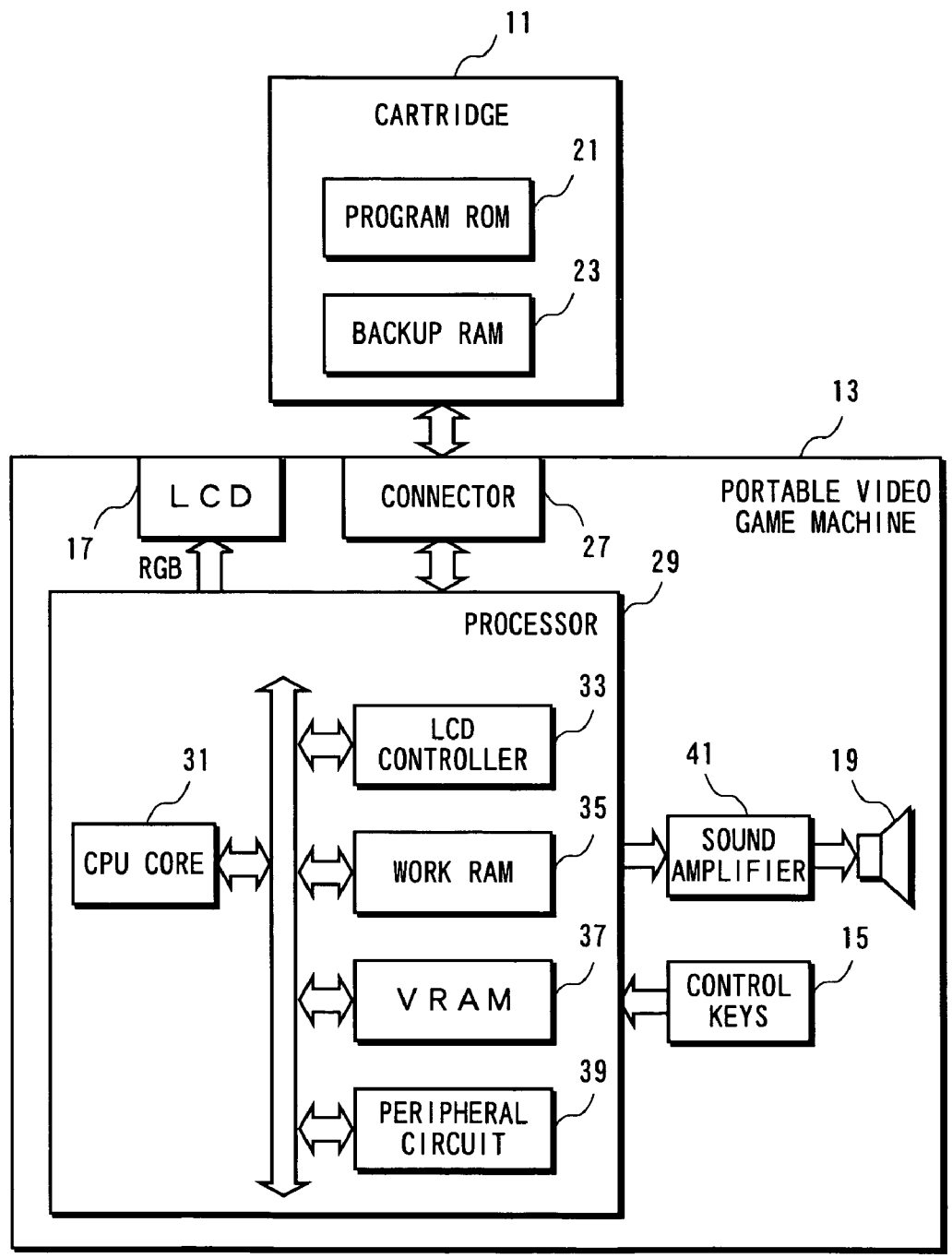
FIG. 2 is a block diagram illustrating an internal configuration of the video game system of a first exemplary embodiment.

A first exemplary illustrative video game system will now be described with reference to the drawings.

FIG. 1 generally illustrates the video game system. The video game system includes a portable video game machine 13 and a cartridge 11. The portable video-game machine 13 includes an LCD 17, a speaker 19, and a plurality of control keys 15 (e.g., an A button 15a, a B button 15b, a cross-shaped control pad 15c, etc.).

Referring to FIG. 2, the internal configuration of the video game system will now be described. The cartridge 11 includes a program ROM 21 storing a video game program, and a backup RAM 23 for storing game data produced at a certain point in the game process, as necessary. The game data stored in the backup RAM 23 includes a plurality of game parameters indicating the status of a game. The memory map of the program ROM 21 and that of the backup RAM 23 will be described below.

The portable video game machine 13 includes the LCD 17 for displaying a game image, a connector 27 via which the cartridge 11 is connected to the portable video game machine 13, a processor 29 for performing the game process based on a video game program supplied from the cartridge 11, the speaker 19, a sound amplifier 41, and the control keys 15. The processor 29 includes a CPU core 31 for executing various operations based on the video game program, an LCD controller 33 for driving the LCD 17, a work RAM 35 as a work memory for the CPU core 31, a VRAM 37 for image processing, and a peripheral circuit 39 being a sound circuit, a DMA circuit, or the like.

In this exemplary illustrative embodiment, a video game program is supplied to the processor 29 of the portable video game machine 13 from the cartridge 11. However, the present invention is not limited to this, and a video game program may be supplied from any other computer-readable recording medium such as a CD-ROM or a DVD. Alternatively, a video game program may be supplied via a wired or wireless communications line. Alternatively, a video game program may be pre-stored in any storage device provided inside the portable video game machine 13. Moreover, the present invention is not limited to portable video game machines, but may be any other suitable video game machine such as home-console video game machines. In such a case, game data may be backed up in an external storage medium such as a memory card or an HDD.

Figure 3:
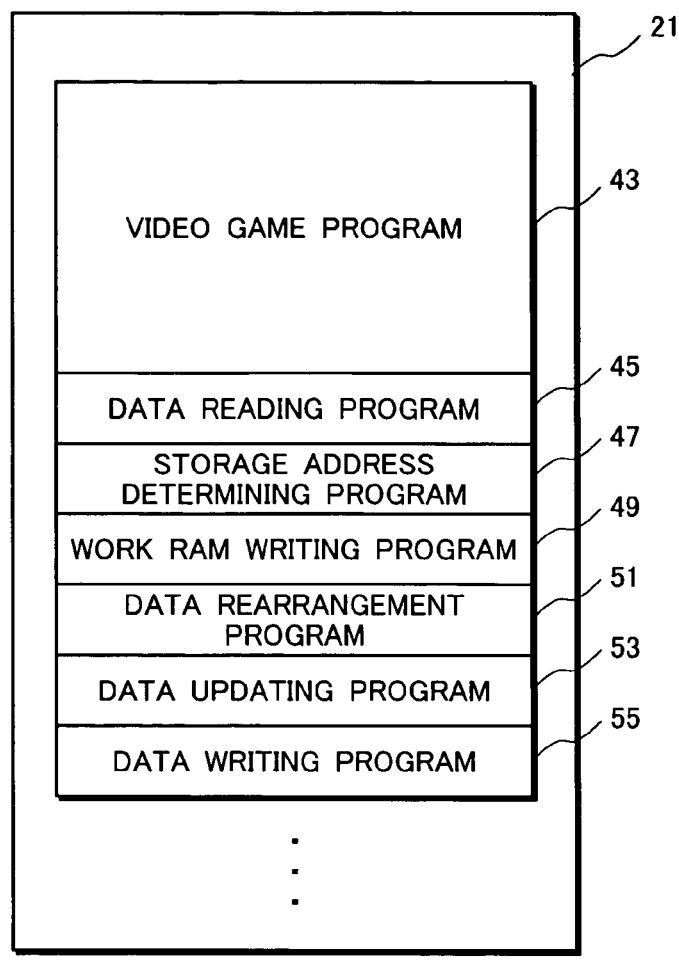
FIG. 3 is a memory map of a program ROM 21.

Referring to FIG. 3, the memory map of the program ROM 21 will now be described. As shown in FIG. 3, the program ROM 21 stores, in addition to a video game program 43 for performing the game process, various other programs for all game data in the work RAM 35 of the portable video game machine 13 so that the game data can be used in the game process, including a data reading program 45, a storage address determining program 47, a work RAM writing program 49, a data rearrangement program 51, a data updating program 53, and a data writing program 55. In the illustrated example, each function to be performed by the computer is separately designated as a program for the sake of simplicity. In practice, all of the program functions may be present as a single module, or a single program function may be split and present in a plurality of modules.

Figure 4:
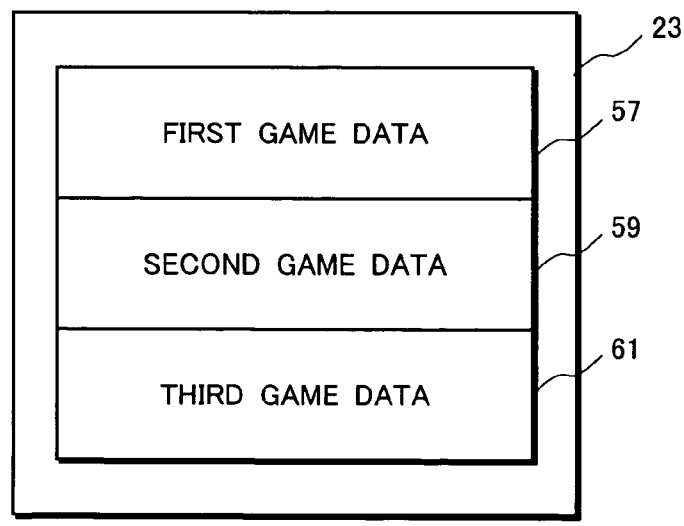
FIG. 4 is a memory map of a backup RAM 23.
Figure 5:
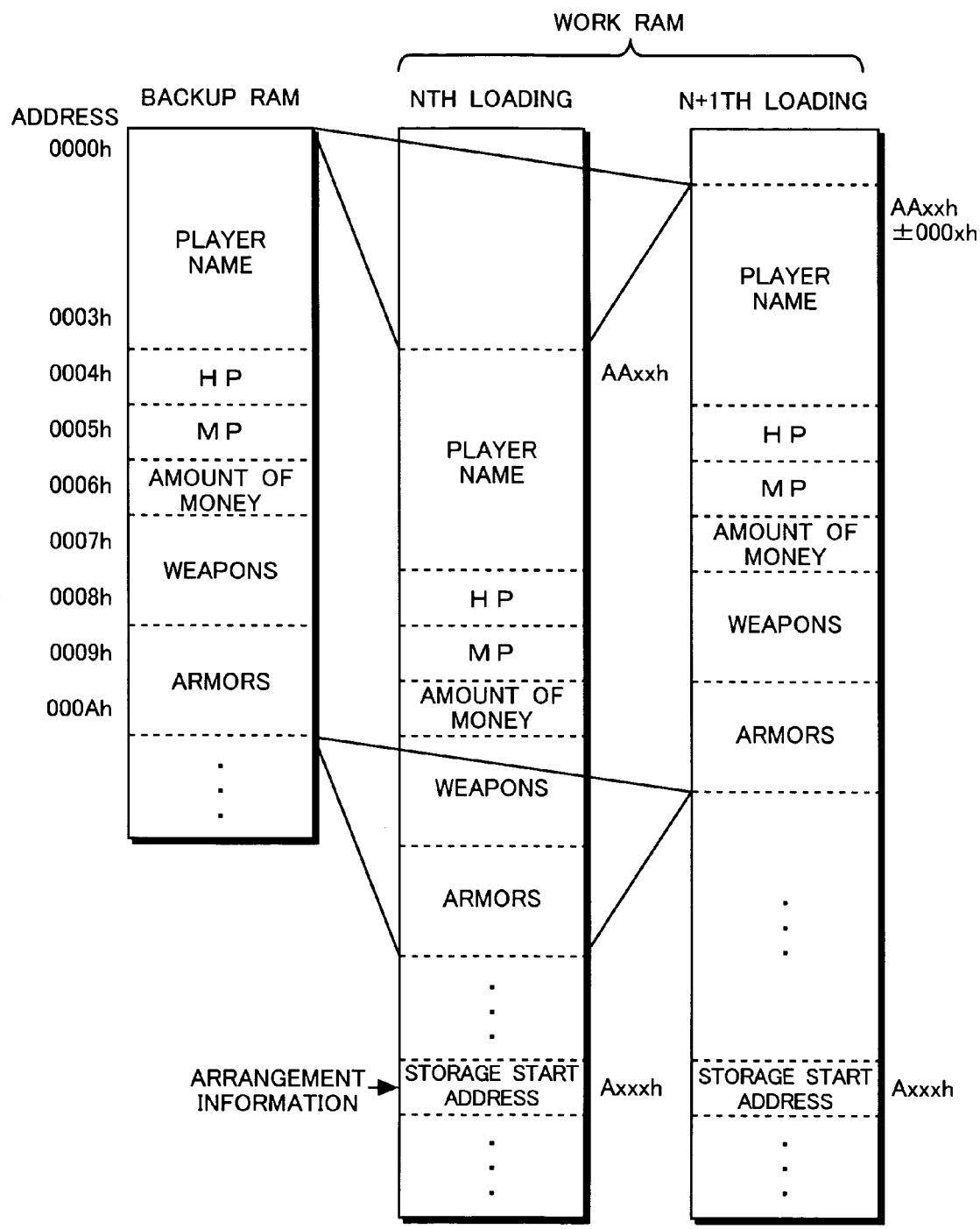
FIG. 5 shows the principle of a method for arranging game data in a work RAM 35.

Referring to FIG. 4, the memory map of the backup RAM 23 will now be described. As shown in FIG. 4, the backup RAM 23 stores game data for at least one game title (the video game program stored in the program ROM 21). In the illustrated example, three different sets of game data (first through third sets of game data) are stored. These sets of game data may be data for different game titles, or may be data for the same game title saved at different times in the progress of the game. While each game title uses different game parameters and different values therefor, an exemplary structure of a set of game data is shown in FIG. 5. Referring to FIG. 5, the game data includes a plurality of game parameters representing the status of a game. The game parameters include the player name, the hit points ("HP") representing the physical strength remaining in the character, the magic points ("MP") representing the magical power remaining in the character, the amount of money, a collection of weapons the character has, a collection of armors the character has, the position of the character on the map when the game was suspended (not shown), the time at which the game was suspended (not shown), etc. While the video game program 43 is running, the values of the game parameters are temporarily stored in the work RAM 35 of the portable video game machine 13, and are updated as the game progresses. When the player suspends the game, or on other suitable occasions, the values of the game parameters currently stored in the work RAM 35 are saved in the backup RAM 23 of the cartridge 11 as a set of game data as shown in FIG. 4. When the player resumes the game, the game data is loaded back to the work RAM 35 of the portable video game machine 13. Thus, the player can resume the game from the point where the game was suspended.

Referring to FIG. 5, a method for arranging game data in the work RAM 35 will now be described.

In a conventional video game system, when a suspended game is resumed, game data saved in a memory card is always loaded to a particular storage address of an internal memory, as described above. In this illustrative exemplary embodiment, before loading the game data, a storage area of the work RAM 35 to which the game data is to be loaded is set so that the storage area is changed for each data loading operation. More specifically, the storage area in the work RAM 35 for storing game data is set so that the start address of the storage area (hereinafter referred to as the "storage start-address") changes for each data loading operation, as illustrated in FIG.

5. As a result, the storage area for each game parameter (e.g., "the amount of money") changes for each data loading operation.

In order to refer to or overwrite a particular game parameter in the work RAM 35 while the video game program 43 is running, it is necessary to specify the storage address of the game parameter. In this exemplary illustrative embodiment, when loading game data, the storage start address for the game data is stored as arrangement information at a particular address (Axxxh in the illustrated example) of the work RAM 35, as illustrated in FIG. 5. This particular address is not changed as often as the storage area of game data is changed. The arrangement information is information that directly or indirectly indicates the storage area for each game parameter. When referring to or overwriting a particular game parameter in the work RAM 35, the work RAM 35 is accessed at the particular address and the arrangement information (the storage start address in the illustrated example) saved at the particular address is referred to. Then, based on the arrangement information, the current storage address for that game parameter is calculated.

Figure 6:
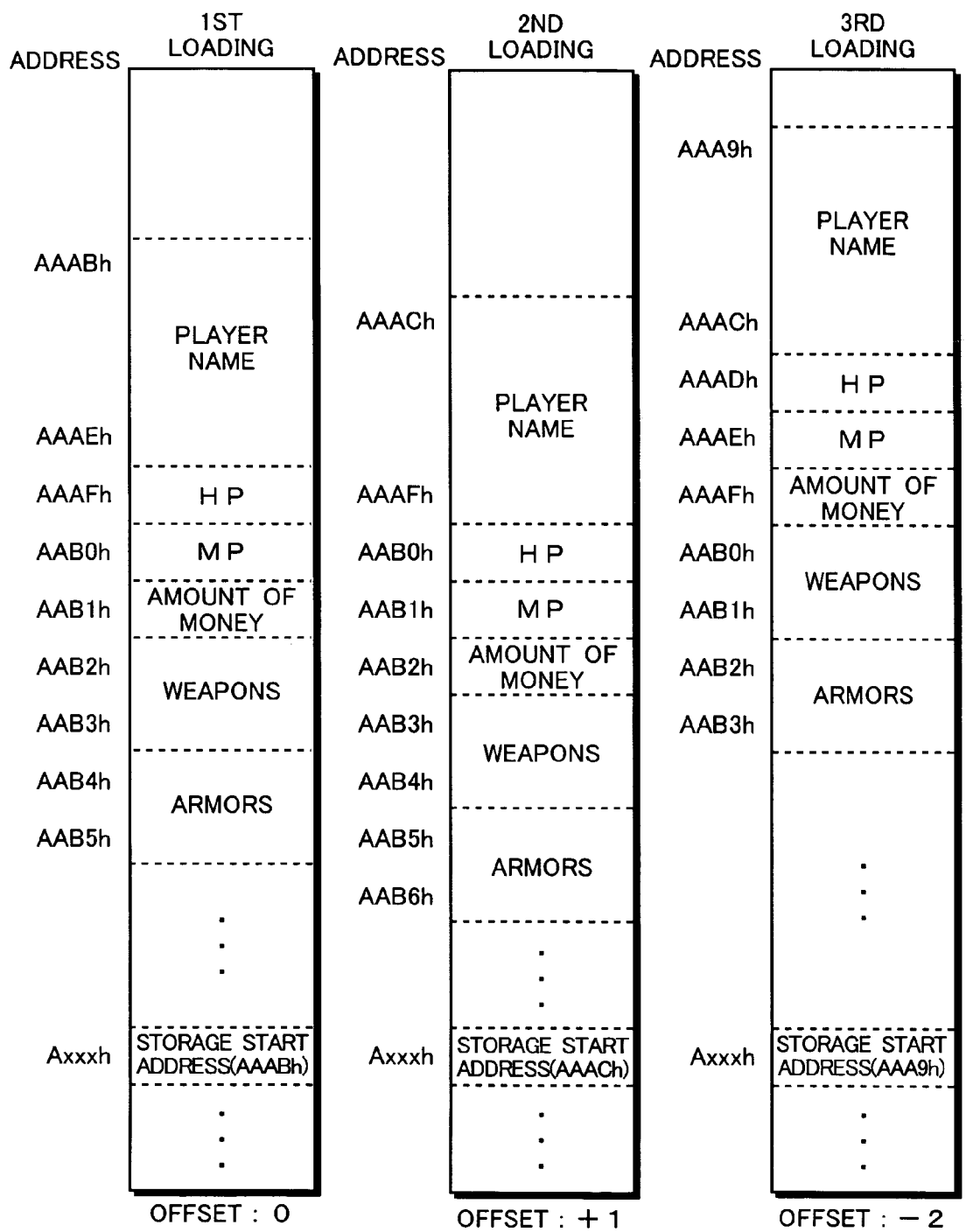
FIG. 6 shows a specific example of how game data is arranged in the work RAM 35.

FIG. 6 shows a specific example of how the storage area for each game parameter in the work RAM 35 changes for each data loading operation. In the illustrated example, an offset is determined randomly for each data loading operation, and an address obtained by adding the offset to a particular address in the work RAM 35 (AAABh in the illustrated example) is set as the storage start address. Specifically, for the first data loading operation, the offset is determined to be "0", based on the storage start address for the game data which is calculated to be AAABh, and the obtained value AAABh is stored in a particular area (at the address Axxxh) for storing the storage start address. For the second data loading operation, the offset is determined to be "+1", based on the storage start address for the game data which is calculated to be AAACh, and the obtained value AAACh is stored in the particular area (at the address Axxxh) for storing the storage start address. For the third data loading operation, the offset is determined to be "−2", based on the storage start address for the game data which is calculated to be AAA9h, and the obtained value AAA9h is stored in the particular area (at the address Axxxh) for storing the storage start address.

Thus, the storage area for each game parameter is changed for each data loading operation. Therefore, even if a player identifies the storage address for a particular game parameter by monitoring data in the work RAM 35, the storage address for that game parameter will be changed to another address when game data is loaded next time after saving the game data on the backup RAM 23. Thus, the game parameter cannot be modified unless the storage address for that game parameter is identified again. Moreover, even if a player identifies the storage address for a particular game parameter by monitoring data in the work RAM 35 and publicly discloses the storage address information, that information will be meaningless for other people. Therefore, general users may be discouraged from modifying game data.

Figure 7:
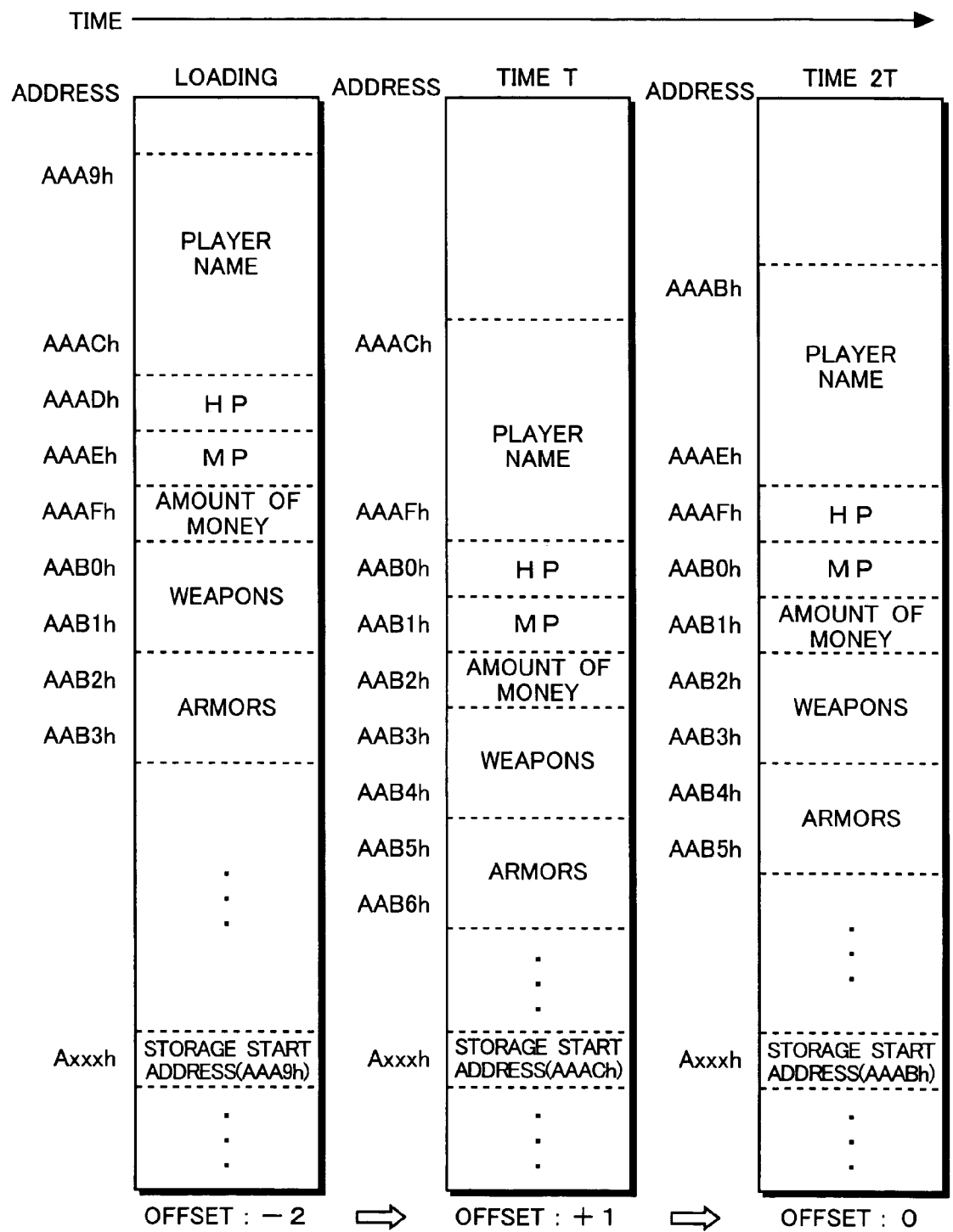
FIG. 7 shows a specific example of how game data is rearranged in the work RAM 35.

A technique in which the storage area for game data is changed for each data loading operation has been described above. Alternatively, the storage area for game data may be changed while rearranging the game data at a predetermined time after the game data is loaded to the work RAM 35. Particularly, a sufficient effect can be obtained by employing a technique in a product as described below. However, a better effect can be expected if the technique below is used in combination with the technique described above, as will now be described. Referring to FIG. 7, the game data rearrangement process will be described.

FIG. 7 is a specific example of how the storage area for each game parameter in the work RAM 35 changes for every passage of a predetermined time T (e.g., 1 second) after game data is loaded. Referring to FIG. 7, the offset is determined to be "−2" when the game data is loaded, based on the storage start address for the game data which is calculated to be AAA9h, and the obtained value AAA9h is stored in a particular area (at the address Axxxh) for storing the storage start address. Then, after the passage of time T, a new offset is determined randomly. In the illustrated example, the new offset is determined to be "+1", based on the storage start address for the game data which is calculated to be AAACh, and the obtained value AAACh is stored in the particular area (at the address Axxxh) for storing the storage start address. Then, the game data is rearranged according to the calculated storage start address. Then, after the passage of time T (i.e., after the passage of 2T from the data loading operation), another new offset is determined randomly. In the illustrated example, the new offset is determined to be "0", based on the storage start address for the game data which is calculated to be AAABh, and the obtained value AAABh is stored in the particular area (at the address Axxxh) for storing the storage start address. Then, the game data is rearranged according to the calculated storage start address.

Thus the storage area for each game parameter is changed at predetermined intervals during the game process, whereby it is more difficult to identify the storage address for a particular game parameter. With a common method for identifying the storage address for a particular game parameter, the storage area for a particular game parameter is identified as follows. When a particular game parameter (e.g., "the level of the player character") displayed on the game screen changes from 19h to 1Ah to 1Bh, for example, an area in the work RAM 35 where the value undergoes the same transitions (i.e., from 19h to 1Ah to 1Bh) is identified as a possible candidate for the storage area for that game parameter. However, this method is useless where the storage area for each game parameter changes at intervals. Particularly, if time T is shorter, it is more difficult to identify the storage address for a particular game parameter. Therefore, it is preferred that time T is as short as possible to such an extent that the game data rearrangement process will not impose an excessive computational load.

Referring to the flowchart of FIG. 8, the operation of the video game system of this exemplary illustrative embodiment will now be described.

First, the CPU core 31 displays a list of game data sets stored in the backup RAM 23 on the LCD 17 (S101). Then, it is determined whether or not the user has selected any game data set (S103). When a game data set is selected, the process proceeds to the storage address determining process in step 105.

Figure 9:
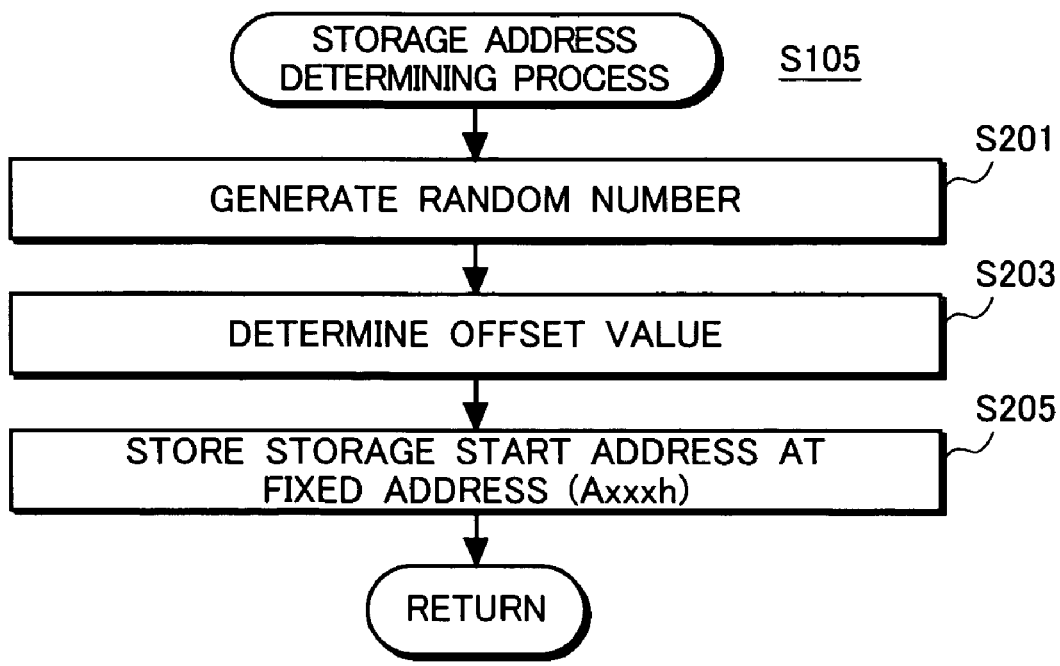
FIG. 9 is a flowchart showing a storage address determining process.

Referring to FIG. 9, the storage address determining process in step 105 will now be described. First, the CPU core 31 generates a random number (S201). The method for generating a random number in this step is not limited to any particular method as long as an irregular sequence of values can be generated or produced. For example, a random number may be generated by using software or hardware, by using a predetermined table of random numbers, by using the count value of a real-time clock, by using the amount of time from when a list of game data sets is displayed in step 101 until the user selects a game data set in step 103, or by using a count value at the time when a control switch is pressed. Then, the CPU core 31 determines the offset value based on the random number generated in step 201 (S203). Specifically, the program has an address of the work RAM 35 to be the base address for storing game data, and the offset value is a value to be added to the base address. In the following step, the calculated offset value is added to the base address, whereby the storage start address is calculated with some randomness, and is stored at a fixed address of the work RAM 35 (S205). The base address is an absolute address for saving game data in the work RAM 35. Since the offset value has randomness, the storage start address also has randomness, whereby the storage area in the work RAM 35 for game data shifts with randomness, as illustrated in FIG. 6 and FIG. 7. The wider the range of offset values is, the more difficult it is to identify the storage area for game data and to modify the game data. However, the range of offset values is preferably limited to an appropriate range in view of the limited capacity of the work RAM 35. After the offset value is determined, the CPU core 31 stores the storage start address, as arrangement information, at a fixed address (Axxxh in the example illustrated in FIG. 5) of the work RAM 35. It can be said that the fixed address as used herein is an absolute address as seen by the program, and the storage address at which game data is stored is a relative address with some randomness. With the storage address determining process, a different storage start address is determined each time game data is loaded from the cartridge, whereby the game data can be stored in the storage area with some randomness.

Figure 8:
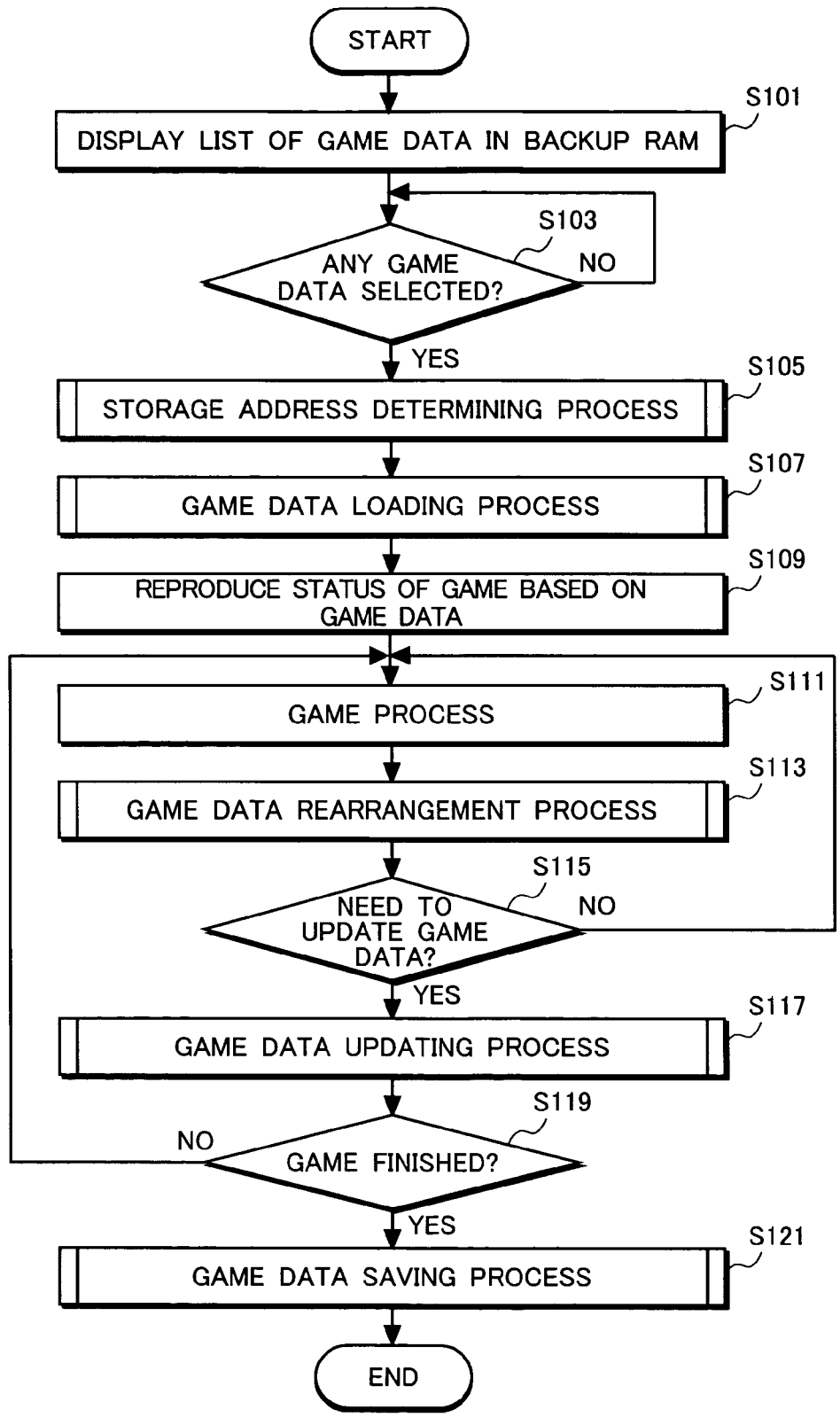
FIG. 8 is a flowchart showing the operation of the video game system of the first exemplary illustrative embodiment.

When the storage address determining process is finished, the process proceeds to the game data loading process in step 107 in FIG. 8.

Figure 10:
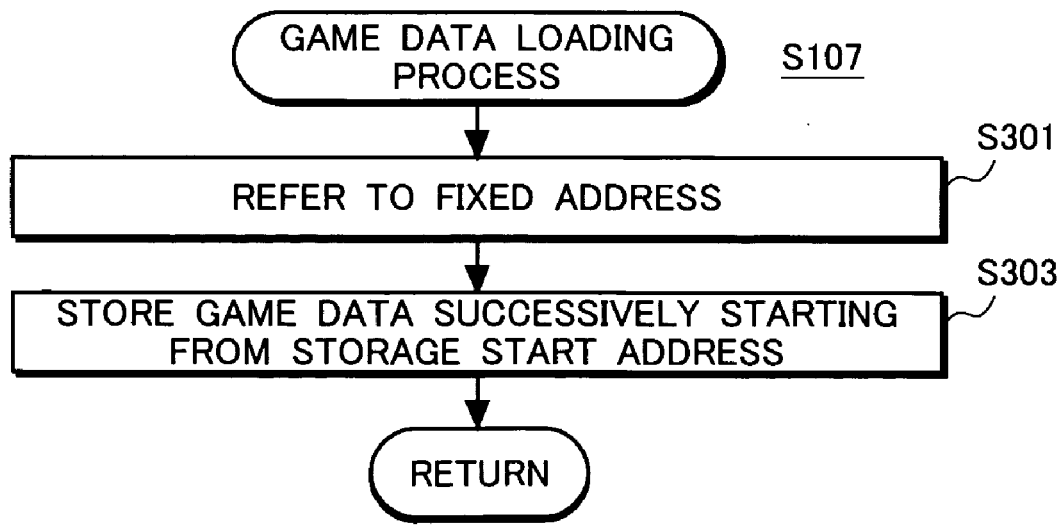
FIG. 10 is a flowchart showing a game data loading process.

Referring to FIG. 10, the game data loading process in step 107 will now be described. First, the CPU core 31 refers to the fixed address (Axxxh) of the work RAM 35 (S301). At this fixed address, the storage start address is stored. Then, a game data set that the user has selected from the list is loaded by the CPU core 31 from the backup RAM 23 of the cartridge 11, and the loaded data values are stored successively starting from the storage start address of the work RAM 35.

When the game data loading process is finished, the CPU core 31 reproduces the status of a game based on the game data loaded to the work RAM 35 (S109).

Then, the CPU core 31 performs the game process (S111), and the performs the game data rearrangement process (S113).

Figure 11:
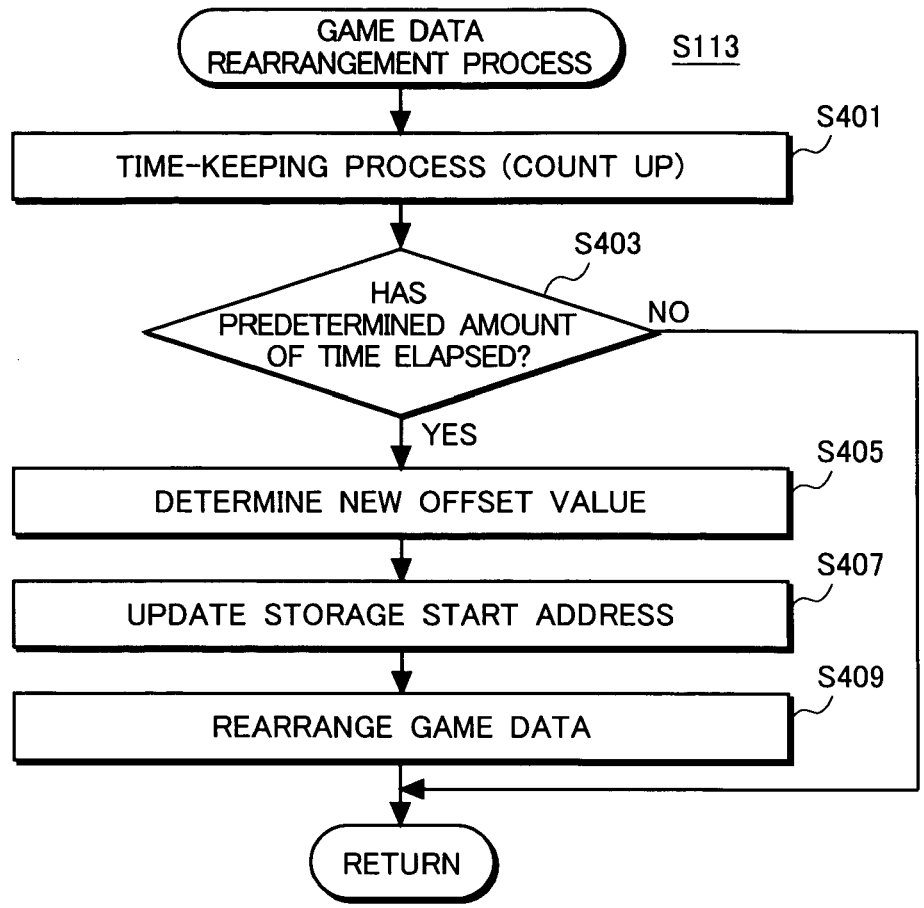
FIG. 11 is a flowchart showing a game data rearrangement process.

Referring to FIG. 11, the game data rearrangement process in step 113 will now be described. In this step, game data is rearranged in the work RAM 35 at predetermined intervals by using substantially the same method as that in step 105. First, the CPU core 31 performs the time-keeping process (S401). Specifically, a time count is kept based on the clock, etc., of the portable video game machine 13. Then, it is determined whether or not a predetermined amount of time (time T) has elapsed from the start of the time count (S403). If the predetermined amount of time has not elapsed yet, the process is terminated without performing the game data rearrangement process. If the predetermined amount of time has elapsed from the start of the time count, a new offset value is determined by using a random number as in step 201 (S405). Then, as in steps 203 and 205, the storage start address is calculated based on the new offset value, and the storage start address stored at the fixed address (Axxxh) is updated based on the calculation result (S407). Then, the CPU core 31 rearranges the game data in the work RAM 35 using the updated storage start address as a base address (S409). Even if someone attempting to overwrite the game data identifies the address at which a particular parameter is stored, the parameter will be moved to a different storage address by the game data rearrangement process in a short time (e.g., in one second). Thus, it is not possible to easily overwrite a particular parameter.

Referring to FIG. 8, when the game data rearrangement process is finished, the CPU core 31 determines whether or not it is necessary to update the game data in the work RAM 35 (S115). If it is not necessary to update the game data, the process returns to step 111. If it is necessary to update the game data, the CPU core 31 performs the game data updating process (S117).

Figure 12:
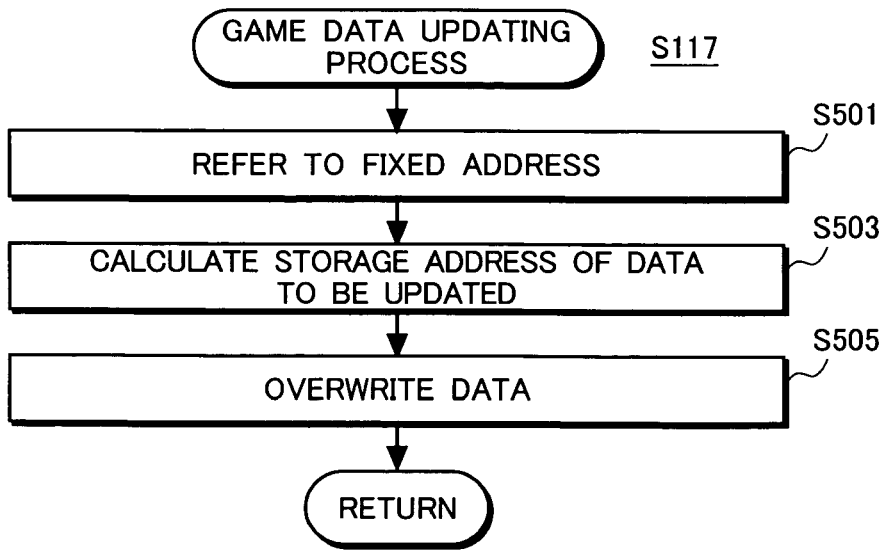
FIG. 12 is a flowchart showing a game data updating process.

Referring to FIG. 12, the game data updating process in step 117 will now be described. First, the CPU core 31 refers to the fixed address (Axxxh) of the work RAM 35 (S501). At this fixed address, the storage start address is stored. The storage address of the data to be updated is calculated based on the storage start address (S503). Referring to FIG. 5, the amount of money, for example, is updated as follows. The amount of money is stored at the seventh address from the beginning of the game data. Thus, the storage address for the amount of money can easily be calculated from the storage start address. Then, the CPU core 31 overwrites the data at the storage address calculated in step 503 (S505). Thus, the game data is updated.

When the game data updating process is finished, the CPU core 31 determines whether or not the game has been finished (S119). If the game is still in progress, the process returns to step 111. If the game has been finished, the game data saving process is performed (S121).

Figure 13:
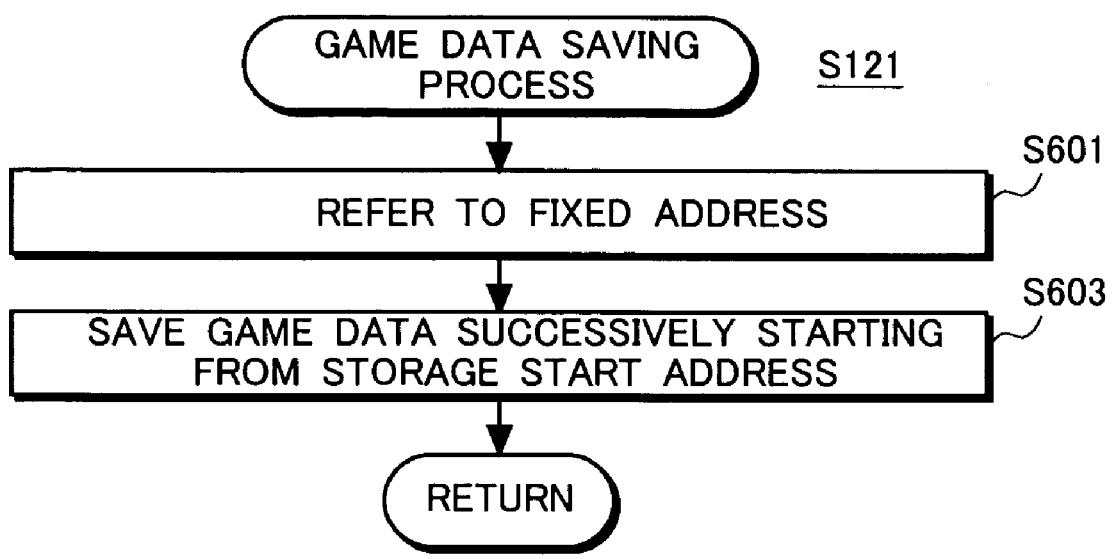
FIG. 13 is a flowchart showing a game data saving process.

Referring to FIG. 13, the game data saving process in step 121 will now be described. First, the CPU core 31 refers to the fixed address (Axxxh) of the work RAM 35 (S601). At this fixed address, the storage start address is stored. The data values in the work RAM 35 are read out successively starting from the storage start address and are stored in the backup RAM 23 in the cartridge 11 (S603). As a result, the game data is stored in the backup RAM 23 in its original format as illustrated in FIG. 5.

As described above, according to the present embodiment, when the game data is loaded from the backup RAM 23 of the cartridge 11 to the work RAM 35 of the portable video game machine 13, the storage area in the work RAM 35 for the game data is determined randomly. Moreover, the storage area is changed randomly at regular intervals during the game process. Therefore, it is difficult to identify storage addresses of the work RAM 35 where particular game parameters are stored. Even if someone identifies the storage address at which a particular game parameter is stored at a certain point in time, the information is meaningful only at that point in time. Thus, it is not possible to easily modify the game data.

This exemplary illustrative embodiment is directed to a case where, when the game data is loaded from the backup RAM 23 of the cartridge 11 to the work RAM 35 of the portable video game machine 13, the storage area in the work RAM 35 for the game data is determined randomly, and the storage area is changed randomly at regular intervals during the game process. However, the present invention is not limited in this way. For example, the storage area in the work RAM 35 for game data may be determined randomly when the game data is loaded, while the storage area is not changed during the game process. Alternatively, the game data may be loaded to a fixed storage area in the work RAM 35, while the storage area is changed randomly at regular intervals during the game process.

Moreover, while the exemplary illustrative embodiment is directed to a case where the storage start address is stored as arrangement information at a fixed address, the present invention is not limited in this way. Specifically, any other suitable information that directly or indirectly indicates the storage area for each game parameter may be stored as arrangement information at a fixed address. For example, the end address of the storage area for the game data in the work RAM 35 may be stored as arrangement information, instead of the storage start address. Alternatively, an offset value may be stored, instead of the storage start address.

Moreover, while the exemplary illustrative embodiment is directed to a case where the storage area for game data is changed randomly at regular intervals during the game process, the present invention is not limited in this way. For example, instead of changing the storage area at regular intervals, the storage area may be changed each time a particular event occurs in the game process. Moreover, instead of randomly changing the storage area, the storage area for the game data may be successively shifted by one address each time the game data is rearranged.

Moreover, while this exemplary illustrative embodiment is directed to a case where the arrangement information is stored at a fixed address, the arrangement information may be encrypted and stored at the fixed address. It is understood that in such a case, a decryption process is needed when referring to the arrangement information stored at the fixed address.

Figure 14:
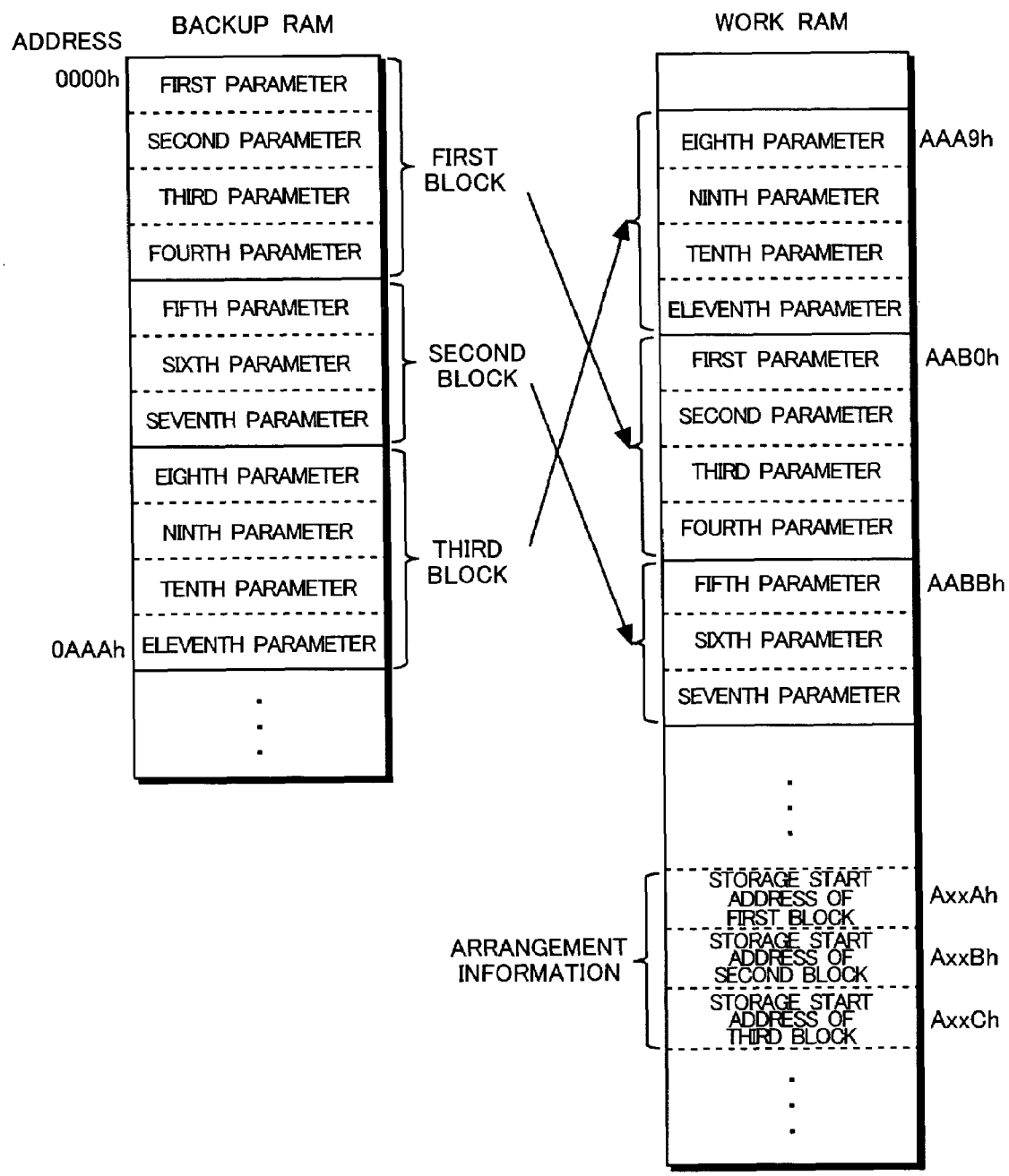
FIG. 14 shows another method for arranging game data in the work RAM 35.
Figure 15:
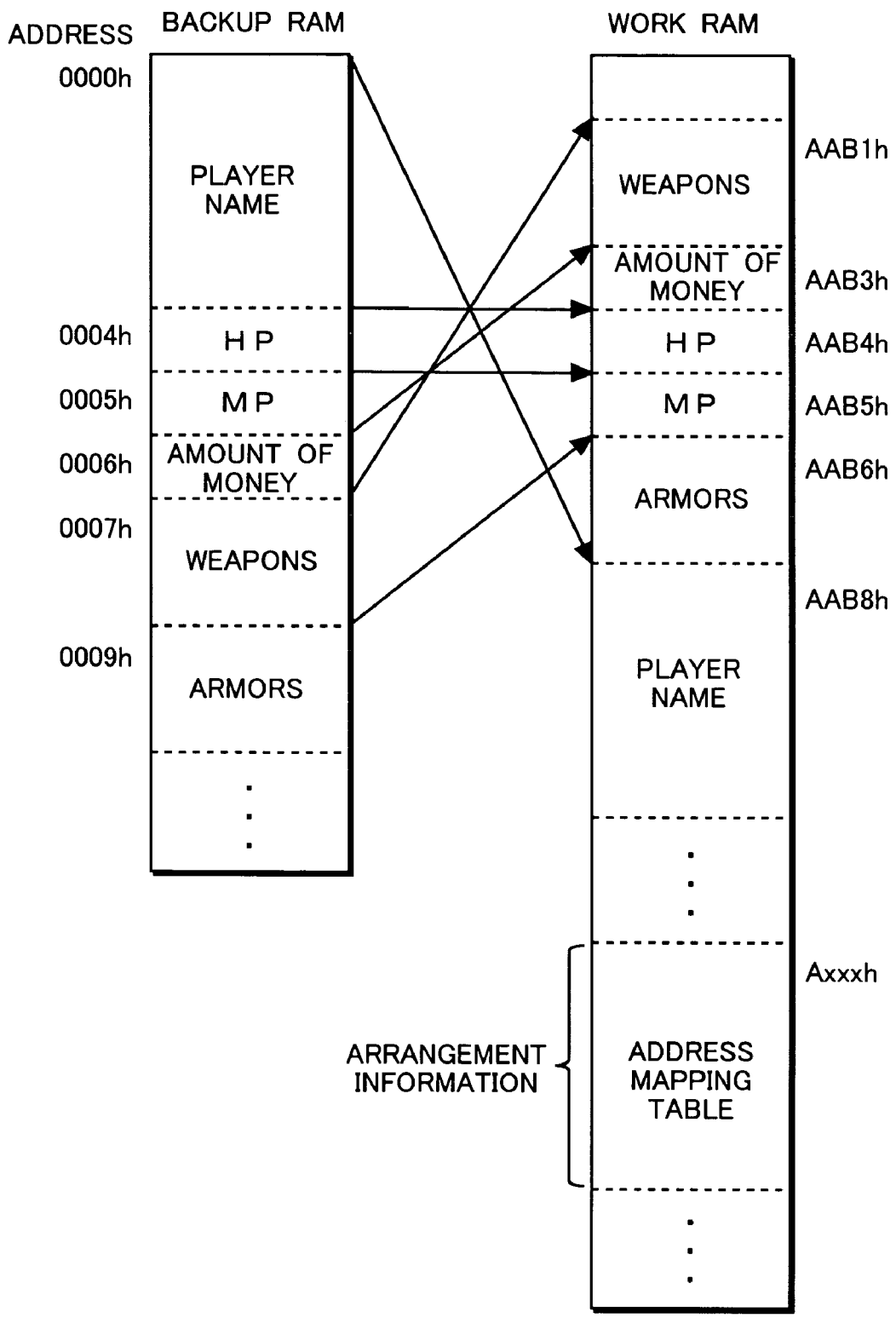
FIG. 15 shows still another method for arranging game data in the work RAM 35.

In this exemplary illustrative embodiment, the storage area for the game data as a whole is shifted based on the offset value so that the storage area for the game parameters will not always be the same. Therefore, the positional relationship between different game parameters in the game data is always the same. For example, in the example illustrated in FIG. 5, the address for "MP" is always followed by the address for "the amount of money", which is always followed by the address for "weapons". Therefore, even though the storage area for each game parameter changes, it may be easy to predict how the storage area for the game data shifts. Referring to FIG. 14 through FIG. 16, a variation that makes such prediction more difficult will now be described.

Referring to FIG. 14, in this variation, the game data is divided into a plurality of blocks (the first block to the third block in the illustrated example), and the storage area for each block of game data is determined and changed randomly. Instead of randomly determining and changing the storage area for each block, the order of the blocks may be determined and changed randomly. In each block, the positional relationship between different parameters is fixed within each block. Therefore, as long as the storage start address for each block is stored as arrangement information, the storage address for any parameter can be calculated based on the arrangement information and the positional relationship between different parameters in each block. In the example illustrated in FIG. 14, the storage start address of the first block (AAB0h) is stored at a fixed address (AxxAh), the storage start address of the second block (AABBh) at a fixed address (AxxBh), and the storage start address of the third block (AAA9h) at a fixed address (AxxCh). Thus, the prediction as described above is made difficult by dividing the game data into a plurality of blocks.

The data size of one block is not limited to any particular size. Referring to FIG. 15, each game parameter may be regarded as one block, in which case the storage area for each game parameter is determined and changed randomly. Thus, the positional relationship between different game parameters becomes irregular, whereby even if someone successfully identifies the storage address for a particular game parameter, it is not possible to predict the storage address for another game parameter. In the example illustrated in FIG. 15, an address mapping table is stored as an example of arrangement information. Referring to FIG. 16, the address mapping table contains the correspondence between the address in the backup RAM 23 and the address in the work RAM 35 for each game parameter. The storage address for each game parameter in the backup RAM 23 is fixed. Therefore, a particular game parameter can be updated by specifying the storage address for the game parameter in the backup RAM 23, which can be converted to the storage address for the game parameter in the work RAM 35 based on the address mapping table. The address mapping table may be dynamically produced when the game data is loaded to the work RAM 35 or when the game data in the work RAM 35 is rearranged. Alternatively, a plurality of address mapping tables may be produced in advance, one of which is randomly selected when the game data is loaded to the work RAM 35 or when the game data in the work RAM 35 is rearranged so that the game data can be loaded or rearranged based on the selected address mapping table.

Another approach is to reduce the data size of one block to the size of one address in the work RAM 35. In such a case, the storage area (storage address) for each one-address block of game data can be determined and changed randomly. Then, a game parameter that spans a plurality of addresses such as "player name" shown in FIG. 5, for example, is divided into portions, which are arranged in discrete addresses, whereby it is very difficult to overwrite the game parameter.

Second Exemplary Illustrative Embodiment

A second exemplary illustrative video game system will now be described with reference to the drawings.

Figure 17:
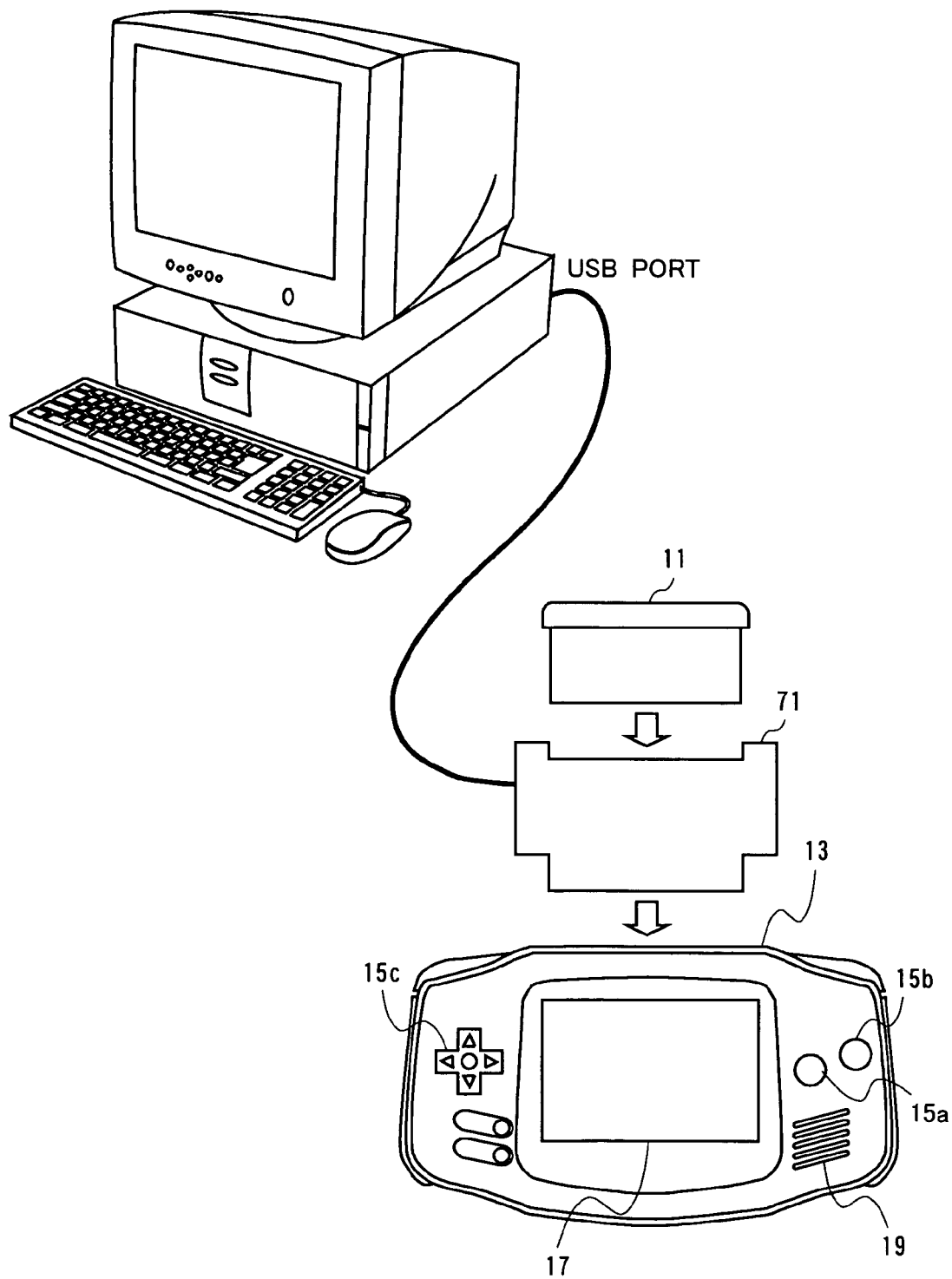
FIG. 17 is a view generally illustrating a second exemplary video game system.

FIG. 17 generally illustrates the video game system. The portable video game machine 13 and the cartridge 11 are the same as those shown in FIG. 1, and thus will be given the same reference numerals and will not be further described below. In the second exemplary illustrative embodiment, the portable video game machine 13 and the cartridge 11 are connected to each other via a game data overwriting device 71 therebetween. While the control keys 15 of the portable video game machine 13 may be used as an input mechanism for operating the game data overwriting device 71, the game data overwriting device 71 is operated via a personal computer in this exemplary illustrative embodiment. Specifically, the game data overwriting device 71 and the personal computer are connected to each other via a communications cable, and a keyboard and a mouse connected to the personal computer are used as an input mechanism for operating the game data overwriting device 71. Moreover, if a program having substantially the same function as that of a control section 79 to be described later is executed by the CPU of the personal computer, the computer can be used in place of the control section 79. Similarly, while the LCD 17 of the portable video game machine 13 can be used as a display for the game data overwriting device 71, if the game data overwriting device 71 and the personal computer are connected to each other via a communications cable, a monitor connected to the personal computer can be used as an input mechanism for operating the game data overwriting device 71.

Figure 18:
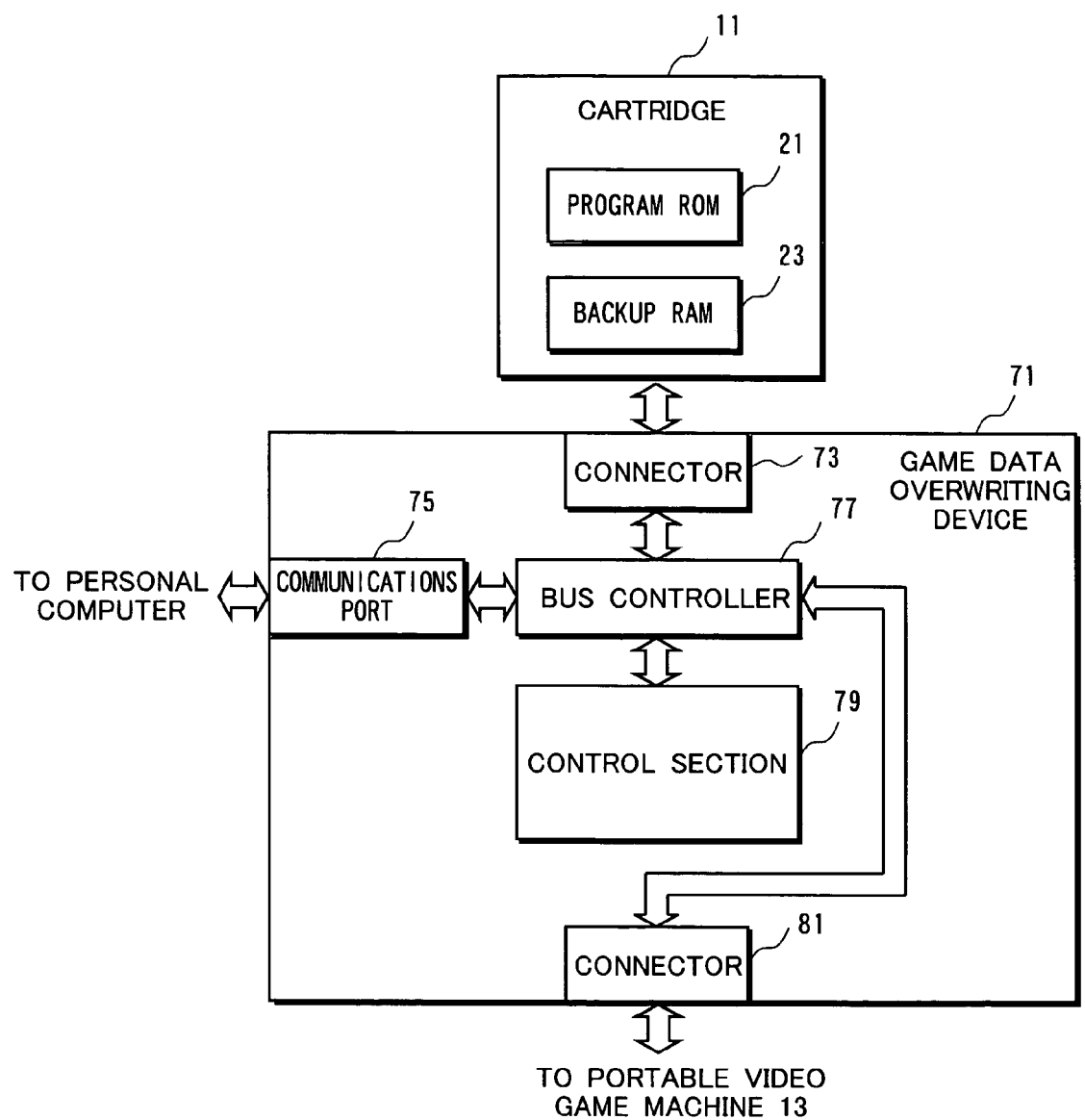
FIG. 18 is a view illustrating an internal configuration of a game data overwriting device 71.

Referring to FIG. 18, the configuration of the game data overwriting device 71 will now be described.

The game data overwriting device 71 includes a connector 73 via which the cartridge 11 is connected to the game data overwriting device 71, a communications port 75 for communicating with the personal computer, the control section 79 for performing a data overwriting process to be described later, a connector 81 via which the portable video game machine 13 is connected to the game data overwriting device 71, and a bus controller 77 for controlling data exchanges between the connectors 73 and 81, the communications port 75 and the control section 79.

Figure 19:
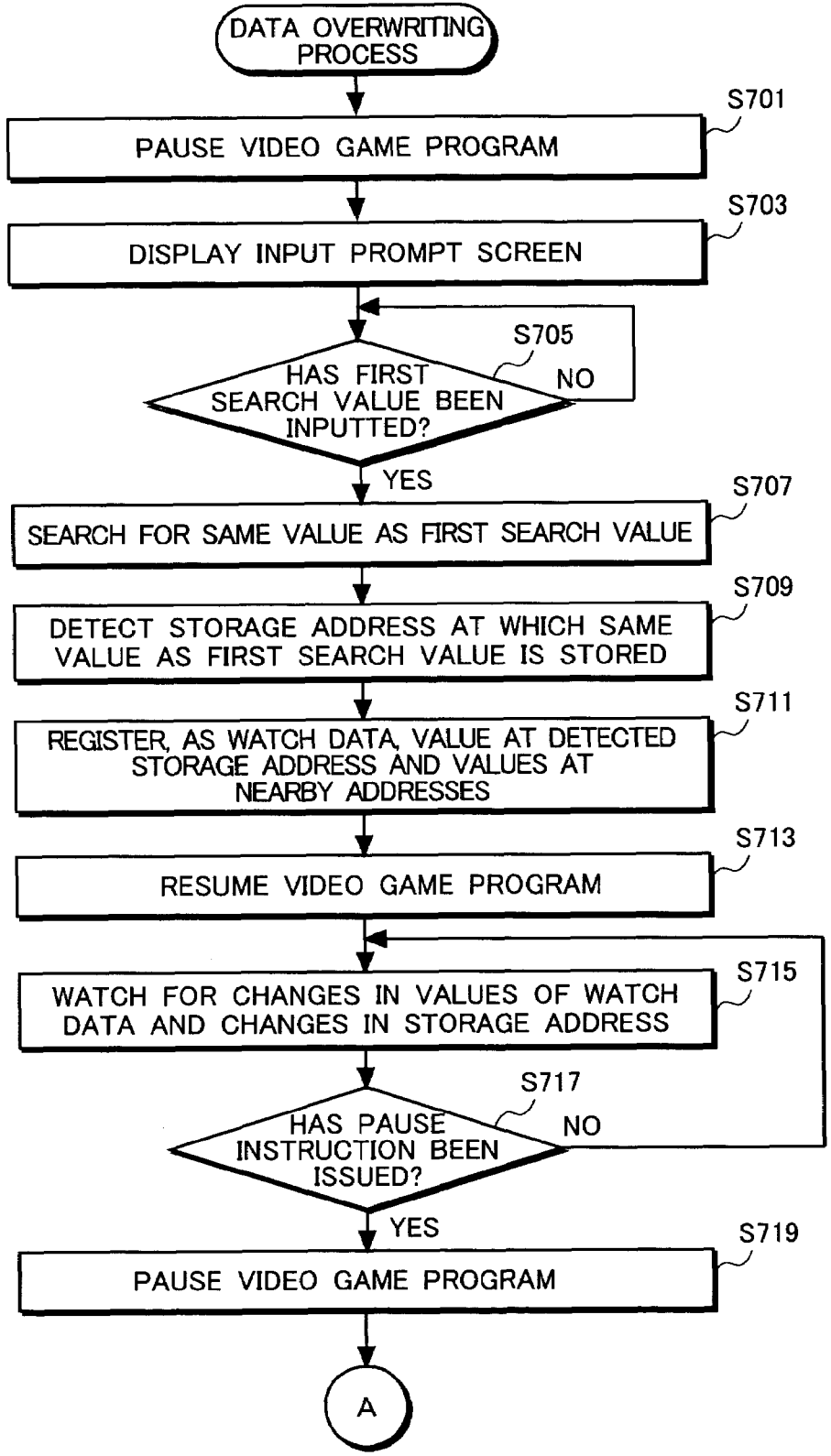
FIG. 19 is a part of a flowchart showing the operation of the video game system of a second exemplary illustrative embodiment.

Referring to the flowchart of FIG. 19, the operation of the control section 79 of the game data overwriting device 71 will now be described. The control section 79 includes a game data overwriting program therein, and the control section 79 performs the data overwriting process according to the game data overwriting program.

First, the control section 79 pauses the video game program running on the portable video game machine 13 (S701). The control section 79 displays an input prompt screen on the LCD 17 of the portable video game machine 13 to prompt the user to input a first search value (S703). The user inputs the current value of the game parameter to be overwritten (e.g., the amount of money: 9Ah) as the first search value. The control section 79 determines whether or not the first search value has been inputted (S705). If it is determined that the first search value has been inputted, the control section 79 searches for the same value (9Ah) as the first search value through the data stored in the work RAM 35 of the portable video game machine 13 (S707). As a result of the search, normally, a plurality of occurrences of the same value as the first search value are detected.

Then, based on the search results, the control section 79 detects a storage address at which the same value as the first search value is stored (S709). Then, the value stored at the detected storage address (e.g., AAAFh) and other values stored at nearby addresses (e.g., values stored at two addresses adjacent to the detected storage address) are registered as watch data (S711). For example, referring to FIG. 7, the amount of money (9Ah) and the adjacent values, i.e., the MP (15h) and the weapons (35h), are registered as watch data. Then, the video game program is resumed (S713).

While the video game program is running, the control section 79 monitors the values of the watch data registered in step 711 and the storage address (S715). When the storage address is changed, the control section 79 detects and monitors the new storage address. In this exemplary illustrative embodiment, not only is the value stored at the storage address detected in step 709 registered as watch data, but also other values stored at nearby addresses are registered as watch data. By taking into consideration values at adjacent addresses, it is possible to more reliably detect a change in the storage address. For example, it can be determined that the storage address is changed when the values of the amount of money (9Ah), the MP (15h), and the weapons (35h) all change at the same time. Then, the control section 79 determines whether or not the user has given an instruction to pause the video game program (S717). The control section 79 continues monitoring until the user gives a pause instruction. The user may pause the video game program when, for example, the value of the amount of money changes from 9Ah to 9Fh. In response to a pause instruction from the user, the control section 79 pauses the video game program (S719).

Figure 20:
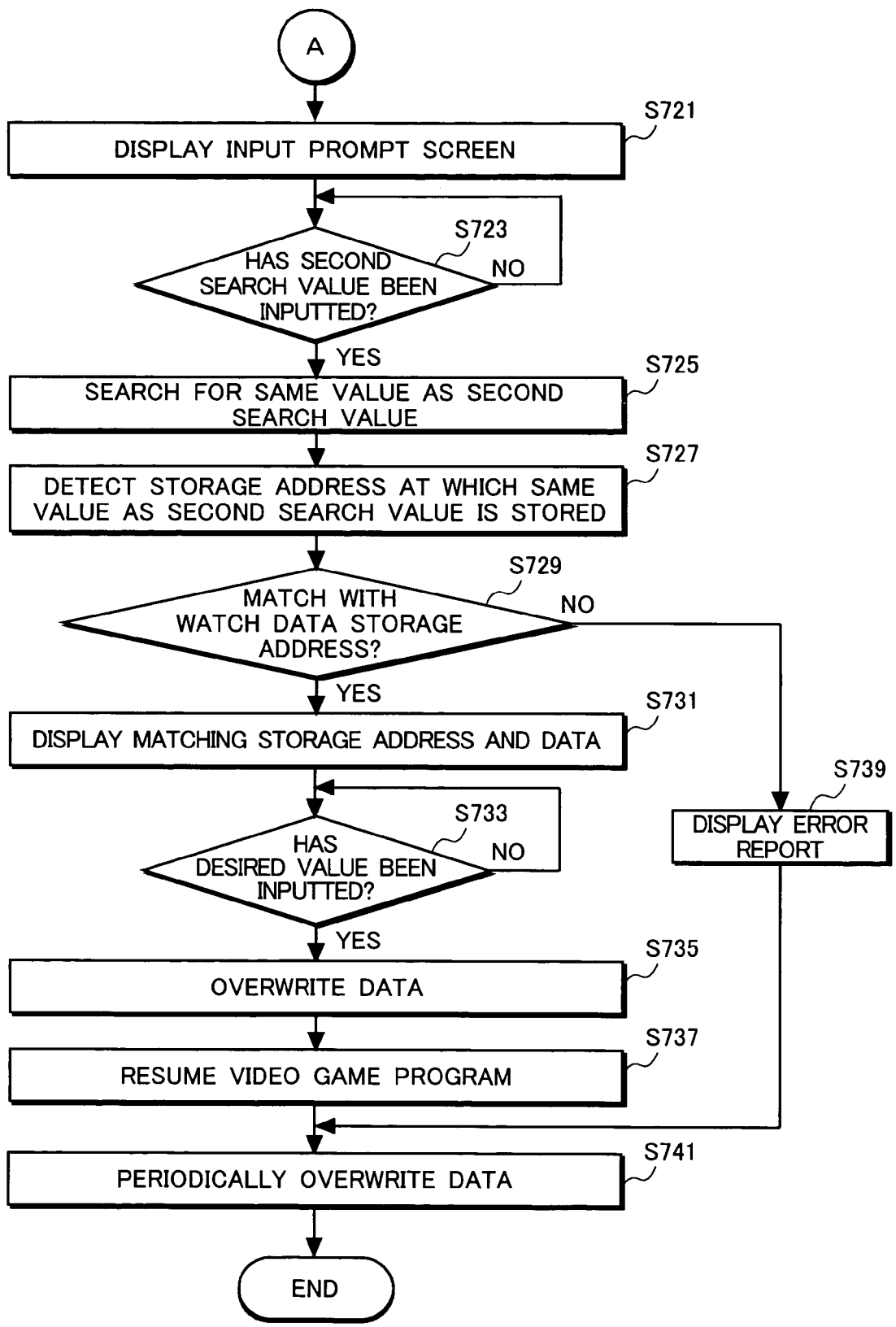
FIG. 20 is the remaining part of the flowchart showing the operation of the video game system of a second exemplary illustrative embodiment.

Then, referring to FIG. 20, the control section 79 displays an input prompt screen on the LCD 17 of the portable video game machine 13 to prompt the user to input a second search value (S721). The user inputs the current value of the game parameter to be overwritten (e.g., the amount of money: 9Fh) as the second search value. The control section 79 determines whether or not the second search value has been inputted (S723). If it is determined that the second search value has been inputted, the control section 79 searches for the same value (9Fh) as the second search value through the data stored in the work RAM 35 of the portable video game machine 13 (S725).

Then, based on the search results, the control section 79 detects a storage address at which the same value as the second search value is stored (S727). Then, the control section 79 determines whether or not the detected storage address matches the storage address of the value registered as watch data (S729). If they do not match, the control section 79 displays an error report on the LCD 17 of the portable video game machine 13 stating that the data overwriting process has failed (S739), and the process proceeds to step 741. If the storage address detected in step 727 matches the storage address of the value registered as watch data, the control section 79 displays the storage address and the value (9Fh) on the LCD 17 (S731).

Then, the control section 79 waits for the user to input a desired value (S733). If the user inputs a desired value (e.g., EEh), the value (9Fh) currently stored at the storage address is overwritten to the inputted desired value (EEh) (S735). Then, the control section 79 resumes the video game program (S737). Where the value of the game parameter (the amount of money) that the user has overwritten needs to be maintained at the value (EEh) inputted by the user in step 733, the control section 79 monitors the storage address for the game parameter and periodically overwrites the value at the storage address to the value (EEh) inputted by the user in step 733 (S741).

While the illustrative exemplary embodiment is directed to a case where the video game program is paused and resumed, the present invention is not limited in this way. For example, the value searching process, etc., may be performed while capturing the memory image in a real-time manner, without pausing the video game program.

As described above, according to the second exemplary illustrative embodiment, even if the storage address for each game parameter is changed periodically, the storage address for any particular game parameter can be detected efficiently.

Third Exemplary Illustrative Embodiment

A third exemplary illustrative video game system will now be described with reference to the drawings. The third exemplary illustrative embodiment differs from the second exemplary illustrative embodiment only with respect to the operation of the control section 79. Thus, the configuration of the video game system and the game data overwriting device will not be further described below. FIG. 17 and FIG. 18 will be relied upon in the following description.

Figure 21:
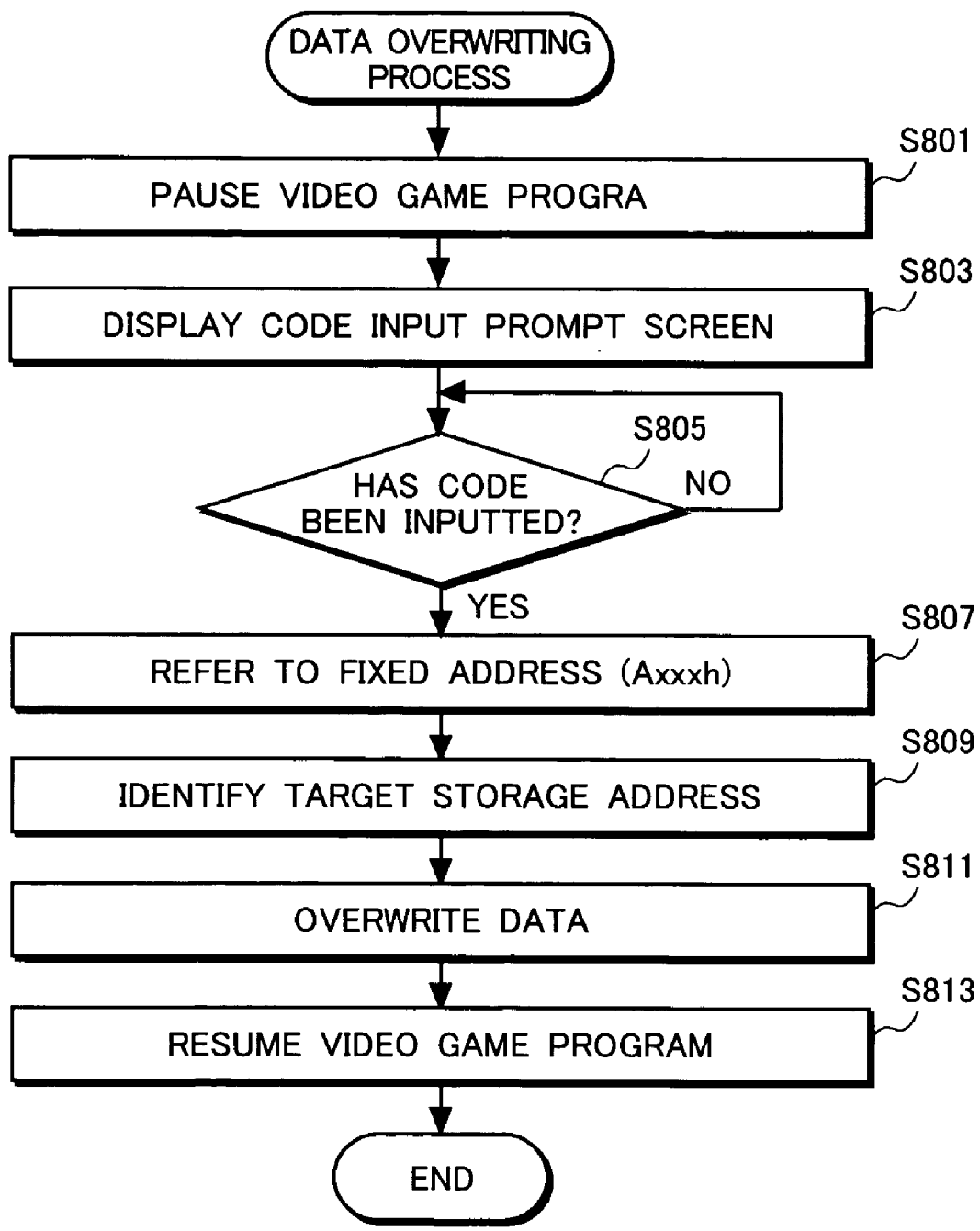
FIG. 21 is a part of a flowchart showing the operation of a third exemplary illustrative video game system.

Referring to the flowchart of FIG. 21, the operation of the control section 79 of the game data overwriting device 71 of the third exemplary illustrative embodiment will now be described. The control section 79 includes a game data overwriting program therein, and the control section 79 performs the data overwriting process according to the game data overwriting program.

First, the control section 79 pauses the video game program running on the portable video game machine 13 (S801). Then, the control section 79 displays a code input prompt screen on the LCD 17 of the portable video game machine 13 to prompt the user to input a code for the data overwriting process (S803). The code used herein includes a value for identifying the storage address for the game parameter to be overwritten and another value for identifying the new value with which the current game parameter value is to be overwritten. The value for identifying the storage address for the game parameter to be overwritten may be, for example, a value indicating the relative address of the storage address for the game parameter with respect to the start address of the game data. For example, referring to FIG. 6, the code for overwriting the value of the amount of money to EEh includes a value (07h) and a value (EEh).

The control section 79 determines whether or not a code has been inputted (S805). If a code has been inputted, the control section 79 obtains the storage start address by referring to a fixed address (AAABh in the example illustrated in FIG. 6) of the work RAM 35 of the portable video game machine 13 (S807). Then, based on the obtained storage start address and the value (07h) included in the code for identifying the storage address for the game parameter to be overwritten, the control section 79 identifies the target storage address at which the game parameter to be overwritten is stored (S809).

Then, the control section 79 overwrites the value stored at the storage address (AAB1h) identified in step 809 with the value (EEh) included in the code for identifying the new value (S811). Then, the control section 79 resumes the video game program (S813).

Where an offset value is stored as arrangement information at a fixed address (Axxxh) of the work RAM 35, the storage address when the offset value is "0" can be used as "the value for identifying the storage address for the game parameter to be overwritten" included in the code. In such a case, with the example illustrated in FIG. 6, the value for identifying the storage address for the amount of money is AAB1h. Then, in step 809, the current storage address for the amount of money can be calculated by adding the current offset value to AAB1h.

As described above, according to the third exemplary illustrative embodiment, even if the storage address for each game parameter is changed periodically, the value of any particular game parameter can be overwritten by using the arrangement information stored at a fixed address of the work RAM 35.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable recording medium, storing a game data control program for arranging game data in an internal memory of a video game device for use in a game process, the game data including a plurality of game parameters representing a status of a game stored in an external storage medium connected to the video game device, wherein the game data control program instructs a computer to function as:

a storage area setter for setting a storage area for the game data in the internal memory so that each game parameter is arranged in a different storage area (a) before the game data is arranged and (b) each time the game data is arranged, such that each game parameter is arranged in a storage area that differs each time a game parameter is arranged;

a game data loader for loading the game data from the external storage medium to the storage area set by the storage area setter;

arrangement information storage programmed logic circuitry for storing arrangement information in a specified area of the internal memory, when the storage area setter sets the storage area for the game data, the arrangement information being information which directly or indirectly indicates the storage area for each game parameter; and storage area determination programmed logic circuitry for determining the storage area for the game parameter by referring to the arrangement information, when a game parameter in the internal memory needs to be referred to or overwritten during the game process, wherein the storage area setter specifies an offset value for shifting the storage area for the game data as a whole in the internal memory so that the storage area for the game data is changed each time the game data is arranged; and the game data loader loads the game data as a whole to the internal memory so that a storage position relationship between the game parameters is maintained, by using, as a base address, an address obtained by adding the offset value to a specified address of the internal memory.

2. The computer-readable recording medium according to claim 1, wherein the storage area setter directly or indirectly sets the storage area for the game data by specifying at least one address of the internal memory.

3. The computer-readable recording medium according to claim 1, wherein the game data control program instructs the computer to function further as a game data saver for saving the game data in a predetermined original format in the external storage medium by referring to the arrangement information, when the game data in the internal memory needs to be saved in the external storage medium during the game process.

4. The computer-readable recording medium according to claim 1, wherein the storage area setter sets the storage area for the game data in the internal memory based on a random number.

5. The computer-readable recording medium according to claim 1, wherein the game data is divided into a plurality of blocks, and the storage area setter sets a storage area for each block of game data in the internal memory so that a storage position relationship between the blocks is changed each time the game data is arranged.

6. The computer-readable recording medium according to claim 5, wherein each block corresponds in size to one address of the internal memory.

7. The computer-readable recording medium according to claim 1, wherein the game data control program instructs the computer to function further as:

a storage area changer for changing the storage area for each game parameter which has been loaded to the internal memory, at a predetermined time during the game process; and a data rearranger for rearranging the game parameters based on results of the storage area changing process by the storage area changer, wherein the arrangement information storage programmed logic circuitry updates the arrangement information when the data rearranger rearranges the game parameters.

8. A computer-readable recording medium, storing a game data overwriting program for overwriting data of a predetermined parameter included in the game data, which is stored in the internal memory by the game data control program according to claim 1, wherein the game data overwriting program instructs a computer to perform:

prompting a player to input a first search value;

searching for a value corresponding to the first search value through the game data stored in the internal memory and detecting at least one first storage address at which the value is stored;

following the first storage address, which dynamically changes, by using, as indices, values at a plurality of storage addresses which are each in a fixed positional relationship with the detected first storage address and the value at the first storage address;

prompting the player to input a second search value;

searching for a value corresponding to the second search value and detecting at least one second storage address at which the value is stored;

determining a target storage address as being one of the at least one second storage address that coincides with the first storage address;

prompting the player to input a new value for the target storage address; and overwriting the value at the target storage address with the inputted new value.

9. A computer-readable recording medium, storing a game data overwriting program for overwriting the game data, which is arranged in the internal memory by the game data control program according to claim 1, wherein the game data overwriting program instructs a computer to perform:

receiving an input of a code for overwriting a predetermined item of the game data with a predetermined value;

identifying a target storage address at which the predetermined game data item to be overwritten is stored, based on the inputted code and the arrangement information stored in the internal memory by the arrangement information storage programmed logic circuitry; and overwriting a value of a game data item stored at the identified target storage address with the predetermined value indicated by the code.

10. A computer-readable recording medium, storing a game data control program for arranging game data in an internal memory of a video game device for use in a game process, the game data including a plurality of game parameters representing a status of a game stored in an external storage medium connected to the video game device, wherein the game data control program instructs a computer to function as:

a game data loader for loading the game data from the external storage medium to the internal memory;

a storage area changer for changing a storage area for each game parameter which has been loaded to the internal memory, at a predetermined time during the game process such that each game parameter is arranged in a storage area that differs each time a game parameter is arranged;

a data rearranger for rearranging the game parameters based on results of the storage area changing process by the storage area changer;

arrangement information storage programmed logic circuitry for storing arrangement information in a specified area of the internal memory, when the game parameters are rearranged by the data rearranger, the arrangement information being information which directly or indirectly indicates the storage area for each game parameter; and storage area determination programmed logic circuitry for determining the storage area for the game parameter by referring to the arrangement information, when a game parameter in the internal memory needs to be referred to or overwritten during the game process, wherein the storage area changer changes the storage area for the game data in the internal memory by specifying an offset value for shifting the storage area for the game data as a whole in the internal memory; and the data rearranger rearranges the game data as a whole in the internal memory so that a storage position relationship between the game parameters is maintained, by using, as a base address, an address obtained by adding the offset value to a specified address of the internal memory.

11. The computer-readable recording medium according to claim 10, wherein the storage area changer directly or indirectly sets the storage area for the game data after the storage area changing process by specifying at least one address of the internal memory.

12. The computer-readable recording medium according to claim 10, wherein the game data control program instructs the computer to function further as game data saver for saving the game data in a predetermined original format in the external storage medium by referring to the arrangement information, when the game data in the internal memory needs to be saved in the external storage medium during the game process.

13. The computer-readable recording medium according to claim 10, wherein the storage area changer changes the storage area for the game data in the internal memory based on a random number.

14. The computer-readable recording medium according to claim 10, wherein the game data is divided into a plurality of blocks, and the storage area changer changes a storage area for each block of game data in the internal memory so that a storage position relationship between the blocks is changed each time the game data is rearranged.

15. The computer-readable recording medium according to claim 14, wherein each block corresponds in size to one address of the internal memory.

16. A game data overwriting device, including therein the game data overwriting program according to claim 8, and a control section for overwriting a game data item according to the game data overwriting program.

17. A game data overwriting device, including therein the game data overwriting program according to claim 9, and a control section for overwriting a game data item according to the game data overwriting program.

18. A computer-readable recording medium, storing a game data overwriting program for overwriting data of a predetermined parameter included in the game data, which is stored in the internal memory by the game data control program according to claim 10, wherein the game data overwriting program instructs a computer to perform:

prompting a player to input a first search value;

searching for a value corresponding to the first search value through the game data stored in the internal memory and detecting at least one first storage address at which the value is stored;

following the first storage address, which dynamically changes, by using, as indices, values at a plurality of storage addresses which are each in a fixed positional relationship with the detected first storage address and the value at the first storage address;

prompting the player to input a second search value;

searching for a value corresponding to the second search value and detecting at least one second storage address at which the value is stored;

determining a target storage address as being one of the at least one second storage address that coincides with the first storage address;

prompting the player to input a new value for the target storage address; and overwriting the value at the target storage address with the inputted new value.

19. A computer-readable recording medium, storing a game data overwriting program for overwriting the game data, which is arranged in the internal memory by the game data control program according to claim 10, wherein the game data overwriting program instructs a computer to perform:

receiving an input of a code for overwriting a predetermined item of the game data with a predetermined value;

identifying a target storage address at which the predetermined game data item to be overwritten is stored, based on the inputted code and the arrangement information stored in the internal memory by the arrangement information storage programmed logic circuitry; and overwriting a value of a game data item stored at the identified target storage address with the predetermined value indicated by the code.

\* \* \* \* \*